United States Patent
Miller

(10) Patent No.: US 11,618,206 B2
(45) Date of Patent: *Apr. 4, 2023

(54) GRADIENT PRINTING A THREE-DIMENSIONAL STRUCTURAL COMPONENT

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,537

(22) Filed: Mar. 19, 2020

(65) Prior Publication Data
US 2020/0215746 A1 Jul. 9, 2020

Related U.S. Application Data

(63) Continuation of application No. 15/609,205, filed on May 31, 2017, now Pat. No. 10,596,753.

(Continued)

(51) Int. Cl.
*B29C 64/386* (2017.01)
*B29C 64/10* (2017.01)
(Continued)

(52) U.S. Cl.
CPC ............ *B29C 64/10* (2017.08); *A43B 23/024* (2013.01); *A43B 23/026* (2013.01);
(Continued)

(58) Field of Classification Search
CPC ......... B33Y 10/00; B33Y 30/00; B33Y 50/00; B33Y 50/02; B33Y 80/00; A43B 23/0235;
(Continued)

(56) References Cited

U.S. PATENT DOCUMENTS 9,216,603 B1 12/2015 Mizes et al.
10,052,823 B2 8/2018 Mizes et al.
(Continued)

FOREIGN PATENT DOCUMENTS

CN 1814431 8/2006
CN 103009631 4/2013
(Continued)

OTHER PUBLICATIONS

International Search Report and Written Opinion for related International Application No. PCT/US2017/035131, dated Nov. 3, 2017, 17 pages.

(Continued)

*Primary Examiner* — John L Goff, II
(74) *Attorney, Agent, or Firm* — Klarquist Sparkman, LLP

(57) ABSTRACT

Methods are described for printing a three-dimensional structural component onto a base. For example, a method of printing is provided, including receiving a set of predetermined thicknesses for the three-dimensional structural component. The set of predetermined thicknesses has a first thickness and a second thickness. The first thickness is greater than the second thickness. The method further includes instructing a printing device to print a single layer for the three-dimensional structural component using the set of predetermined thicknesses. The method further includes printing a first portion of the single layer onto the base so that the first portion has the first thickness. The method further includes printing a second portion of the single layer onto the base so that the second portion has the second thickness.

13 Claims, 27 Drawing Sheets

| 2302 | SPOT COLOR TO THICKNESS CORRELATION | 2304 |
|---|---|---|
| CLEAR SPOT COLOR PERCENTAGE | | PRINT LAYER THICKNESS |
| 100% | | 0.25 mm |
| 99.5% | | 0.24875 mm |
| • | | • |
| • | | • |
| • | | • |
| 1% | | 0.00250 mm |
| 0.5% | | 0.00125 mm |

Related U.S. Application Data

(60) Provisional application No. 62/343,757, filed on May 31, 2016.

(51) Int. Cl.
  *B29C 64/112* (2017.01)
  *A43B 23/02* (2006.01)
  *B33Y 50/02* (2015.01)
  *B33Y 10/00* (2015.01)
  *B29C 64/393* (2017.01)

(52) U.S. Cl.
  CPC ........ *A43B 23/0235* (2013.01); *B29C 64/112* (2017.08); *B29C 64/386* (2017.08); *B29C 64/393* (2017.08); *B33Y 10/00* (2014.12); *B33Y 50/02* (2014.12)

(58) Field of Classification Search
  CPC ... A43B 23/024; A43B 23/026; B29C 64/393; B29C 64/386; B29C 64/10; B29C 64/112; B29C 64/00; B29C 64/20; B29C 64/30; H04N 1/4078; B29L 2031/50
  USPC ........................................................ 264/308
  See application file for complete search history.

(56) References Cited

U.S. PATENT DOCUMENTS

| | | | |
|---|---|---|---|
| 2004/0183796 A1* | 9/2004 | Velde | B29C 64/40 345/419 |
| 2010/0021638 A1 | 1/2010 | Varanka et al. | |
| 2011/0042859 A1 | 2/2011 | Patel et al. | |
| 2012/0037073 A1 | 2/2012 | Linares | |
| 2013/0291400 A1 | 11/2013 | Rammig | |
| 2014/0020191 A1 | 1/2014 | Jones et al. | |
| 2015/0093544 A1* | 4/2015 | Van De Vrie | B33Y 10/00 428/156 |
| 2015/0093552 A1 | 4/2015 | Biskop et al. | |
| 2015/0183162 A1 | 7/2015 | Kuk et al. | |
| 2015/0273868 A1 | 10/2015 | Vodopivec et al. | |
| 2016/0325502 A1* | 11/2016 | Lu | B29C 64/112 |
| 2017/0341304 A1* | 11/2017 | Miller | B29C 64/386 |

FOREIGN PATENT DOCUMENTS

| | | | |
|---|---|---|---|
| CN | 103317590 | 9/2013 | |
| CN | 103395207 | 11/2013 | |
| CN | 103777911 A | 5/2014 | |
| CN | 103909655 | 7/2014 | |
| CN | 103950201 | 7/2014 | |
| CN | 104284770 A | 1/2015 | |
| CN | 104428126 | 3/2015 | |
| CN | 104626586 | 5/2015 | |
| CN | 104708824 | 6/2015 | |
| CN | 104859277 A | 8/2015 | |
| CN | 204582456 U | 8/2015 | |
| CN | 104890238 | 9/2015 | |
| CN | 105131625 A | 12/2015 | |
| CN | 105172135 | 12/2015 | |
| CN | 105189126 A | 12/2015 | |
| CN | 105500701 A | 4/2016 | |
| EP | 1442870 | 8/2004 | |
| EP | 2594146 A1 | 5/2013 | |
| EP | 2889124 | 7/2015 | |
| EP | 2838708 B1 | 12/2017 | |
| GB | 2376915 | 12/2002 | |
| JP | 2006330426 A | 12/2006 | |
| JP | 2013022768 A | 2/2013 | |
| WO | WO 2009/055451 A1 | 4/2009 | |
| WO | WO2013167415 A1 | 11/2013 | |
| WO | WO2014015033 A2 | 1/2014 | |
| WO | WO2014165509 A1 | 10/2014 | |
| WO | WO-2015161093 A1 * | 10/2015 | .............. B41M 3/06 |
| WO | WO 2017/074687 A1 | 5/2017 | |
| WO | WO 2017/210254 | 12/2017 | |

OTHER PUBLICATIONS

First Office Action for related Chinese Application No. 201780034061. 1, 7 pages, dated Jun. 1, 2020.

Extended EP Search Report for EP Application No. 21157277.1, 8 pages, dated Jun. 9, 2021.

China National Intellectual Property Administration, China Office Action for related China Patent Application Publication No. CN 113524689A, dated Oct. 14, 2022.

* cited by examiner

GRADIENT PRINTING A THREE-DIMENSIONAL STRUCTURAL COMPONENT

CROSS-REFERENCE TO RELATED APPLICATIONS

This application is a continuation of U.S. patent application Ser. No. 15/609,205, filed May 31, 2017, now U.S. Pat. No. 10,596,753, which claims the benefit of U.S. Provisional Patent Application No. 62/343,757, filed May 31, 2016, both of which are herein incorporated by reference in their entireties.

BACKGROUND

Embodiments relate generally to printing UV-curable graphic layers on bases such as the fabric used to make articles of apparel such as shirts, shorts, pants, jackets, hats or caps, or to make uppers for articles of footwear, such as running, training, jogging, hiking, walking, volleyball, handball, tennis, lacrosse, basketball shoes, and other similar articles of footwear, as well as to make other articles such as backpacks or tents.

Articles of apparel may be made of a woven or nonwoven fabric, or of a mesh material, or may be made of leather, synthetic leather, or of plastic materials. Articles of apparel may have items such as emblems or logos on the sleeves, torso, pants leg, or other portions of the article of apparel. Articles of apparel may also have abrasion-resistant, water-resistant or protective layers at, for example, the elbows, the shoulders, and/or the knees.

Printers or plotters may be programmed to deposit layers of acrylic resin ink, polyurethane ink, TPU ink or silicone ink or other inks on a fabric or other article. Such printers or plotters may be programmed to cover a two-dimensional portion of a fabric, for example, by moving a printhead along a track in a first direction and moving the track in a second direction that is orthogonal to the first direction. Other printers or plotters may move the printhead in a first direction while moving the printer platform in a second direction that is orthogonal to the first direction, or may move the platform in both directions while keeping the printhead stationary.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
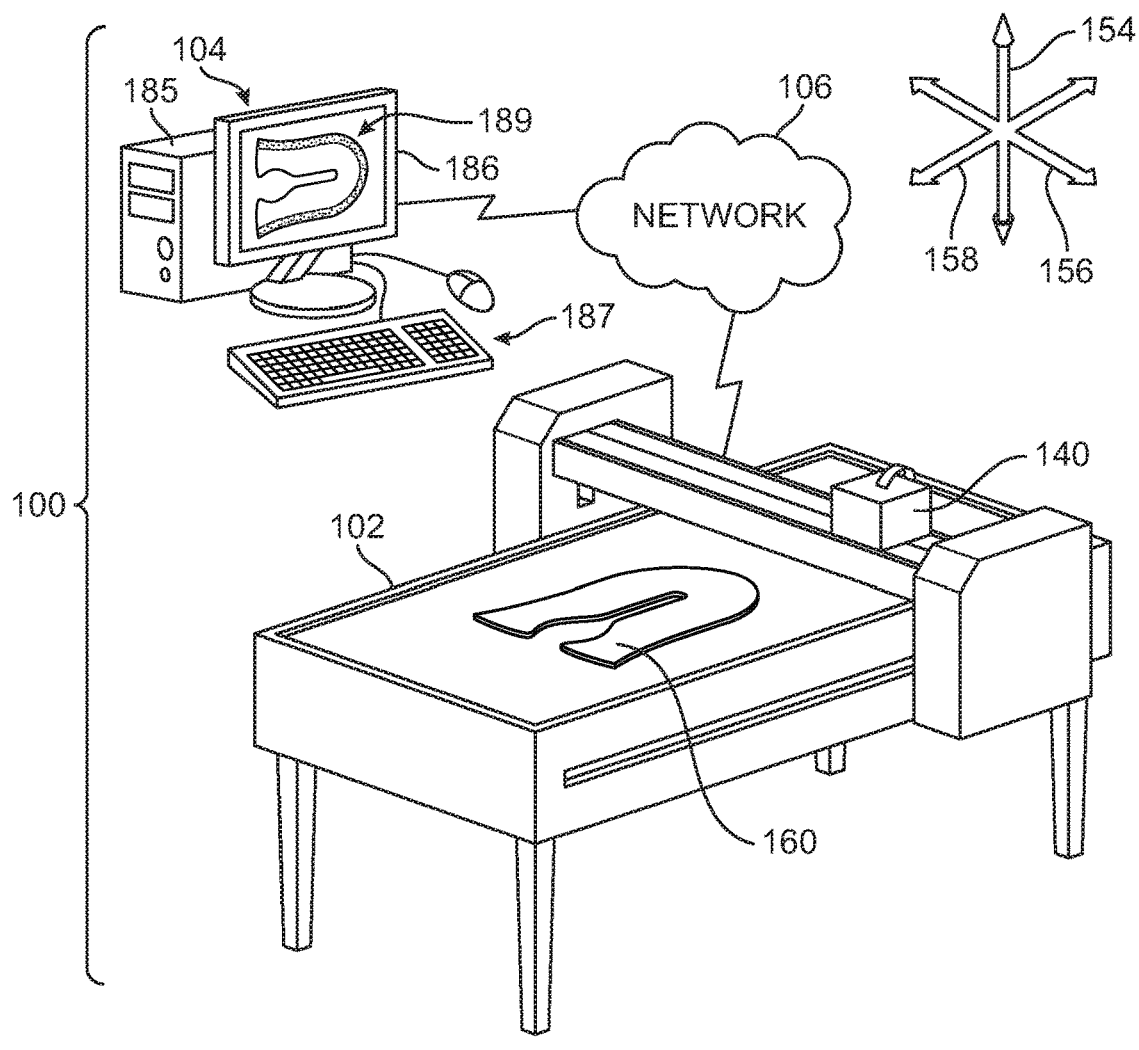
FIG. 1 shows a schematic diagram of a printing system, in accordance with an exemplary embodiment.
Figure 1:
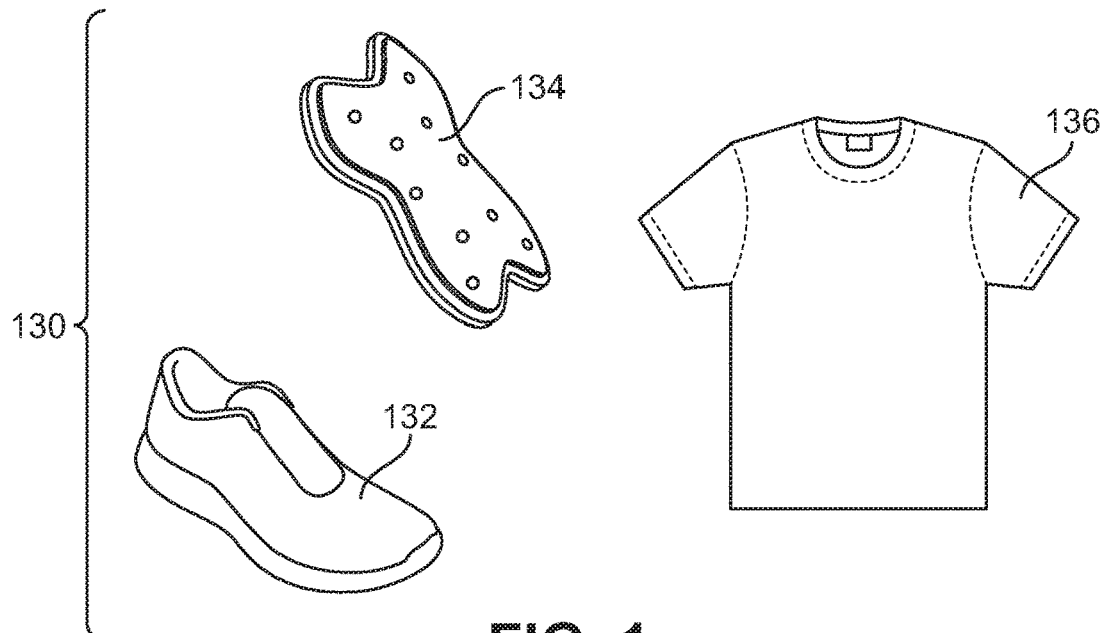

For clarity, the detailed descriptions herein describe certain exemplary embodiments, but the disclosure in this application may be applied to any method for fabricating an article including any suitable combination of features described herein and recited in the claims. In particular, although the following detailed description describes certain exemplary embodiments, it should be understood that other embodiments may be used for the fabrication of other articles of footwear or apparel.

As used herein, the terms "printing device," "printer," "plotter," "3D printer," "three-dimensional printing system," or "3D printing system" may refer to any type of system that can print multiple layers onto a fabric, an article of footwear, an article of apparel or other article, including, for example, sign and graphics printers. The printers may use any appropriate type of UV-curable ink, including acrylic resin ink, polyurethane ink, TPU ink or silicone ink or any other appropriate ink.

In one aspect, a method of printing a three-dimensional structural component onto a base is provided. The method includes receiving a set of predetermined thicknesses for the three-dimensional structural component. The set of predetermined thicknesses has a first thickness and a second thickness. The first thickness is greater than the second thickness. The method includes instructing a printing device to print a single layer for the three-dimensional structural component using the set of predetermined thicknesses. The method includes printing a first portion of the single layer onto the base so that the first portion has the first thickness. The method includes printing a second portion of the single layer onto the base so that the second portion has the second thickness.

In another aspect, a method of printing a three-dimensional structural component onto a base is provided. The method includes receiving a set of predetermined thicknesses for the three-dimensional structural component. The set of predetermined thicknesses has a first thickness corresponding to a first position of the base and a second thickness corresponding to a second position of the base. The first thickness is greater than the second thickness. The method includes instructing a printing device to print a set of layers of the three-dimensional structural component using the set of predetermined thicknesses. The set of layers includes at least a first layer and a second layer. The method includes printing the first layer of the three-dimensional structural component directly onto the base using the set of predetermined thicknesses. Printing the first layer includes printing the first layer to have the first thickness at the first position of the base. Printing the first layer includes printing the first layer to have the second thickness at the second position of the base. The method includes printing the second layer of the three-dimensional structural component directly onto the first layer using the set of predetermined thicknesses. Printing the second layer includes printing the second layer to have the first thickness at the first position of the base. Printing the second layer includes printing the second layer to have the second thickness at the second position of the base.

In another aspect, a method of printing a three-dimensional structural component onto a base is provided. The method includes receiving a set of predetermined thicknesses for the three-dimensional structural component. The method includes instructing a printing device to print a set of layers of the three-dimensional structural component onto the base. The method includes printing the three-dimensional structural component onto the base using the set of predetermined thicknesses to form a printed set of layers. Printing the three-dimensional structural component includes printing a first layer of the set of layers directly onto the base. A separation distance between the base and a printhead assembly of the printing device remains constant during the step of printing the first layer of the set of layers directly onto the base. The printed set of layers includes an exposed surface of the three-dimensional structural component. The exposed surface includes a tall region, an intermediate region, and a short region. The intermediate region abuts the tall region. The intermediate region abuts the short region. A difference in height between the tall region of the exposed surface and the short region of the exposed surface is greater than the separation distance. The intermediate region of the exposed surface has a smoothly sloped geometry.

Other systems, methods, features, and advantages of the embodiments will be, or will become, apparent to one of ordinary skill in the art upon examination of the following figures and detailed description. It is intended that all such additional systems, methods, features, and advantages be included within this description and this summary be within the scope of the embodiments.

Although the drawings and the textual description herein only describe embodiments as they may be used on certain articles of footwear or certain articles of apparel, the descriptions herein may also be applied to other articles of footwear and/or to other articles of apparel, including, for example, articles of footwear such as running, training, jogging, hiking, walking, volleyball, handball, tennis, lacrosse, basketball shoes and other similar articles of footwear, or articles of apparel such as shorts, shirts, jerseys, jackets, pants, gloves, wrist bands, headbands, armbands, hats or caps, as well as to other articles such as backpacks or tents.

FIG. 1 is a schematic view of an embodiment of three-dimensional printing system 100, also referred to simply as printing system 100. Some embodiments of the printing system can include provisions that distribute one or more functions among different devices of the printing system. As shown, printing system 100 may include printing device 102, computing system 104, and network 106. In other embodiments, the printing system may be a single device or component (not shown).

Some embodiments of the printing device can include provisions that permit color printing. In some embodiments, the printing system may use CMYK printing. In other embodiments, the color printing may be conducted using another suitable printing method.

In embodiments where color printing is conducted using CMYK printing, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a key pigment. In some cases, the key pigment may be a black pigment. An example of a printing device using CMYK printing is disclosed in Miller, U.S. Patent Publication Number 2015-0002567, published on Jan. 1, 2015, titled "Additive Color Printing" (U.S. patent application Ser. No.

13/927,551, filed on Jun. 26, 2013), which application is herein incorporated by reference and referred to hereafter as the "Color Printing" application. In some embodiments, printing system 100 can include one or more features of the systems, components, devices, and methods disclosed in the Color Printing application to facilitate color printing. For example, the printing device may be configured to print an image by dispensing droplets of a print material including one or more pigments onto a base. As used herein, droplets may refer to any suitable volume of print material. For example, a droplet may be 1 milliliter of print material. In other embodiments, the printing system may use other systems, components, devices, and methods.

In embodiments where the printing system includes provisions that distribute one or more functions among different devices of the printing system, any suitable division may be used. In some embodiments, printing system 100 can include provisions that control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some embodiments, a print server may be primarily responsible for controlling and/or communicating with printing device 102, while a separate computer (e.g., desktop, laptop, or tablet) may facilitate interactions with a user. Computing system 104 can also include one or more storage devices including, but not limited to, magnetic, optical, magneto-optical, and/or memory, including volatile memory and non-volatile memory.

In some embodiments, any suitable hardware or hardware systems may be used to facilitate provisions that control and/or receive information from printing device 102. In some embodiments, where a computing system is used, computing system 104 may include central processing device 185, viewing interface 186 (e.g., a monitor or screen), input devices 187 (e.g., keyboard and mouse), and software for creating set of predetermined thicknesses 189 for printing a three-dimensional structural component. As used herein, a set of predetermined thicknesses may include any suitable information to facilitate formation of a three-dimensional structural component to have a shape represented by the set of predetermined thicknesses. Examples of shapes represented by a set of predetermined thicknesses may include cylinder, cone, cube, sphere, and the like. In some instances, the set of predetermined thicknesses may be personalized for a particular customer. In other embodiments, other forms of hardware systems may be used.

Generally, any suitable information may be used to facilitate provisions for software for designing a set of predetermined thicknesses for a three-dimensional structural component. In at least some embodiments, software for designing a set of predetermined thicknesses of a printed structure may include not only information about the geometry of the structure but also information related to the materials required to print various portions of the component. In other embodiments, different information may be used.

Generally any suitable design structure may be used to transform the design into information that can be interpreted by printing device 102 (or a related print server in communication with printing device 102). In some embodiments, printing system 100 may be operated as follows to provide one or more components that have been formed using a three-dimensional printing, or additive process. Computing system 104 may be used to design a structure. This may be accomplished using some type of CAD software or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design component.

In some embodiments where the printing system includes provisions that distribute one or more functions among different devices of printing system 100, any suitable protocol, format, and method may be used to facilitate communication among the devices of printing system 100. In some embodiments, these communications are conducted using network 106. In other cases, these communications may be conducted directly between devices of printing system 100.

In some embodiments, the network may use any wired or wireless provisions that facilitate the exchange of information between computing system 104 and printing device 102. In some embodiments, network 106 may further include various components such as network interface controllers, repeaters, hubs, bridges, switches, routers, modems, and firewalls. In some embodiments, network 106 may be a wireless network that facilitates wireless communication between two or more systems, devices, and/or components of printing system 100. Examples of wireless networks include, but are not limited to, wireless personal area networks (including, for example, BLUETOOTH), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots. As used herein, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

Referring to FIG. 1, which shows an embodiment including set of articles 130, in other embodiments, different articles may be used. As shown, set of articles 130 includes article of footwear 132, shin guard 134, and article of apparel 136. In other embodiments, set of articles 130 may be different.

Generally, any suitable surface of the article may be used as a base to receive the three-dimensional objects. In some embodiments, the article includes a surface in a flattened configuration. Referring to FIG. 1, shin guard 134 may have a front surface and/or a back surface in a flattened configuration. In another example, article of apparel 136 may have a front surface and/or a back surface in a flattened configuration. In other embodiments, an article may include a surface having a three-dimensional configuration. For example, a side surface of article of footwear 132 may have a three-dimensional configuration. In another example, a top surface of shin guard 134 may have a three-dimensional configuration. In other embodiments, the printing device and/or printing system may print onto other surfaces.

Some embodiments of the printing system can include provisions that permit printing directly onto the article. In other cases, the three-dimensional structural component is first printed onto a release layer and then transferred onto the article.

In some embodiments any suitable material may be used to form the article to facilitate use of the article. In some embodiments, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a base and the bottom of the print material, and without the need for a perfectly or near perfectly flat base surface on which to print.

In some embodiments, the articles may be customizable. As used herein, a customizable article may be preprocessed and unfinished. Referring to FIG. 1, the processing of article of footwear 132 may include cutting an upper in a particular shape and/or treating the upper to improve durability for use as footwear. In some examples, the upper may be folded and attached to a sole. In other examples, the upper may be in a flat configuration (see FIG. 2). In the example of FIG. 1, article of footwear 132 may not be finished with a mass production design. Instead, article of footwear 132 may be suitable for finishing with a personalized three-dimensional structural component for a particular customer.

Some embodiments of the printing device may include provisions that permit the printhead assembly to be moved across the base to facilitate printing of features, such as images, graphics, designs, and text onto the base. In some embodiments, the printing device may move the printhead assembly along the base. In other embodiments, the printing device may move the base in relation to the printhead assembly.

In embodiments where the printing device moves the printhead assembly, the printing device may move the printhead assembly in a direction parallel to any suitable number of axes. In some embodiments, the printing device may move the printhead assembly along a printing surface. Referring to FIG. 1, printing device 102 may move printhead assembly 140 along base 160 to facilitate a printing onto base 160. In the example, printing device 102 may move printhead assembly 140 parallel to first axis 156 and/or parallel to second axis 158. As shown, first axis 156 may extend parallel to base 160 and/or perpendicular to second axis 158. In the example, second axis 158 may extend parallel to base 160 and/or perpendicular to first axis 156. In some embodiments, the printing device may raise or lower the printhead assembly. Referring to FIG. 1, printing device 102 may raise or lower printhead assembly 140 along third axis 154. As shown, third axis 154 may be normal to base 160 and perpendicular to first axis 156 and/or second axis 158. In other embodiments, the printing device may move the printhead assembly relative to the base differently.

In embodiments where the printing device moves the base, the printing device may move the base in a direction parallel to any suitable number of axes. In some embodiments, the printing device may move the base horizontally with the printhead assembly. Referring to FIG. 1, printing device 102 may move base 160 parallel to first axis 156 and/or parallel to second axis 158. In some embodiments, the printing device may move the base vertically with the printhead assembly. Referring to FIG. 1, printing device 102 may raise or lower base 160 relative to printhead assembly 140 in a direction parallel with third axis 154. In other embodiments, the printing device may move the base relative to the printhead assembly differently.

Figure 2:
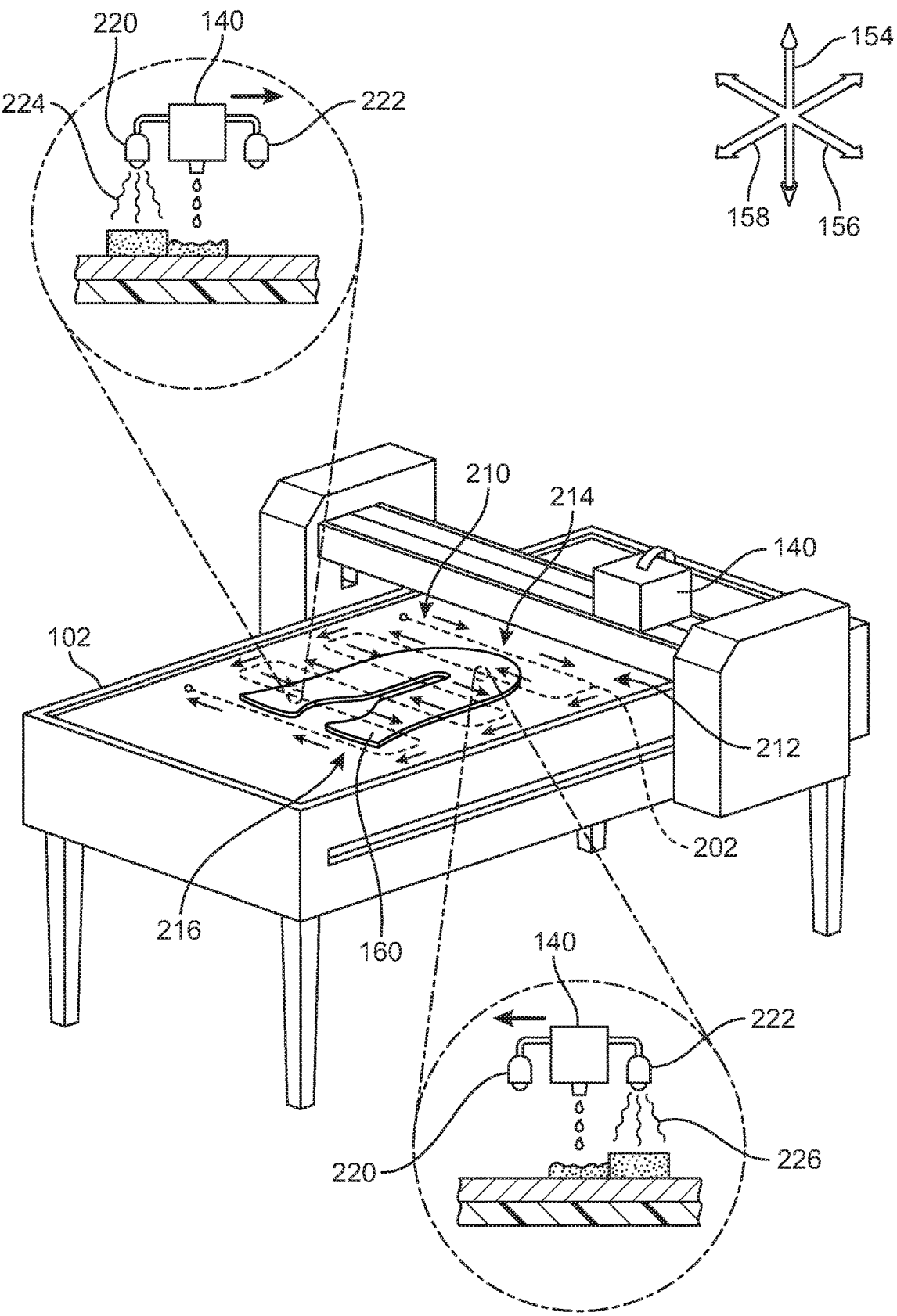
FIG. 2 shows a perspective view of a portion of a printing device, in accordance with an exemplary embodiment.

In some embodiments, the printhead assembly may be moved along a continuous printing path to facilitate printing a single layer onto the entire surface of the base. Referring to FIG. 2, printing device 102 may print along continuous printing path 202. In the example, printhead assembly 140 may initially be positioned at left edge 210 of base 160 and at top edge 214 of base 160. In the example, printhead assembly 140 may be moved relative to base along one direction (e.g., right) of second axis 158 until the printhead assembly 140 is positioned at right edge 212. In the example, printhead assembly 140 may subsequently be moved relative to base along one direction (e.g., down) of first axis 156 toward bottom edge 216 of base 160 and then moved relative to base 160 along the other direction (e.g., left) of second axis 158 until the printhead assembly 140 is positioned at left edge 210. In this manner, printhead assembly 140 may continuously dispense print material onto an entire upper surface of base 160. In other embodiments, the printhead may be moved along the base differently to facilitate printing on the entire surface of the base.

Some embodiments of the printing device may include provisions that permit the printhead assembly to print in both directions along an axis to facilitate printing along a continuous printing path. In some embodiments, the printhead assembly may include a curing device for printing along one direction (e.g., right) parallel to an axis and a curing device for printing along the other direction (e.g., left) parallel to an axis. Referring to FIG. 2, printhead assembly 140 may include curing device 220, which may emit ultraviolet light 224 as printhead assembly moves along one direction (e.g., right) parallel to second axis 158. In the example, printhead assembly 140 may include curing device 222, which may emit ultraviolet light 226 as printhead assembly moves along the other direction (e.g., left) parallel to second axis 158. In other embodiments, a single curing device may be used or more than two curing devices may be used to facilitate printing along a continuous printing path.

Figure 3:
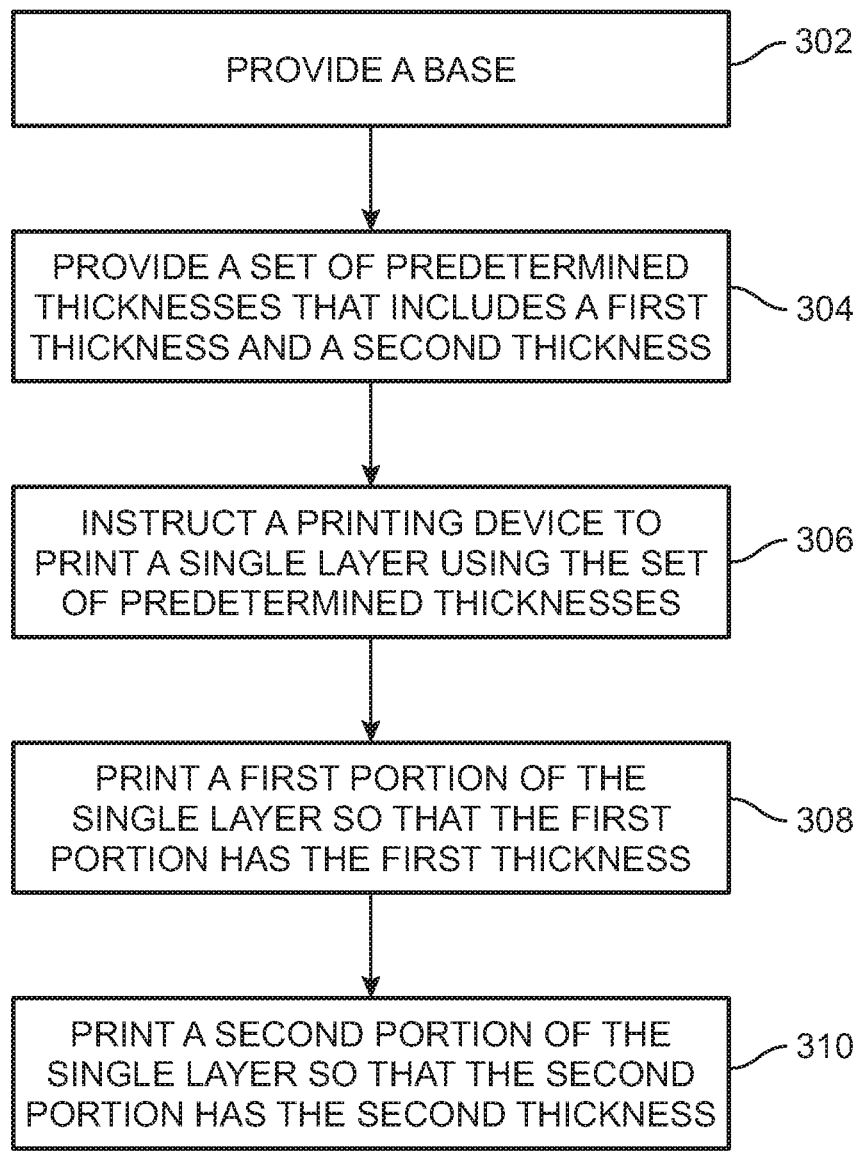
FIG. 3 shows a block diagram of a process for printing a three-dimensional structural component with a single layer having varying thicknesses, in accordance with an exemplary embodiment.

FIG. 3 shows a block diagram of a process for printing a three-dimensional structural component onto a base, in accordance with an exemplary embodiment. The various steps of FIG. 3 may be discussed with respect to FIGS. 4-9. In some embodiments, the steps of FIG. 3 use CMYK printing. In some embodiments, the steps of FIG. 3 may use a continuous printing path. In other cases, other methods, techniques, and/or processes may be used. In some embodiments, the steps of FIG. 3 may be implemented using the system illustrated in FIG. 1. In other cases, other systems and/or devices may be used. It should be understood that additional and/or fewer steps may be used. The processes illustrated in FIGS. 4-9 are for illustrative purposes only.

Figure 4:
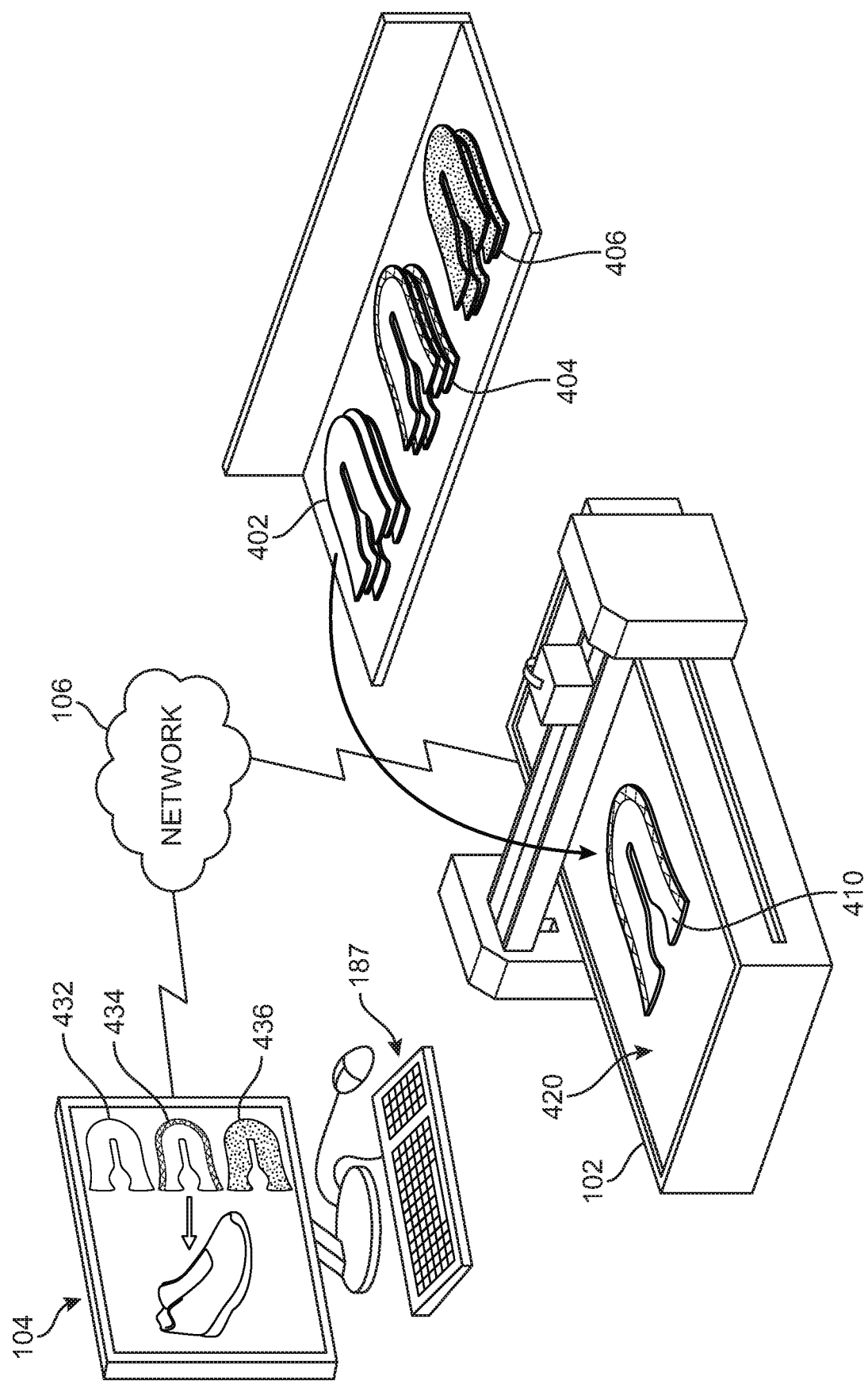
FIG. 4 shows a schematic diagram of the printing system of FIG. 1 receiving a base, in accordance with an exemplary embodiment.

In some embodiments, a base may be provided, as in step 302 (see FIG. 3), to receive a three-dimensional structural component. In some embodiments, the base may be provided manually. Referring to FIG. 4, a human user may place base 410 onto platform 420 of printing device 102 to permit printing device 102 to print directly onto base 410. As shown, the base may be an upper for an article of footwear. It should be understood that the base may be other articles as previously described. In other embodiments, the base may be provided automatically. For example, the placement of base 410 onto printing device 102 may be automated using one or more loaders (not shown) to place base 410 (or another substrate) onto printing device 102.

Some embodiments permit a customization of articles by facilitating a selection of a base from a set of bases. Referring to FIG. 4, a human user may select to print on first upper style 432, second upper style 434, or third upper style 436 using input devices (e.g., keyboard and mouse) 187. In the example, first upper style 432 may have a corresponding first upper supply 402, second upper style 434 may have a corresponding first upper supply 404, and third upper style 436 may have a corresponding first upper supply 406. In the example, base 410 may be selected from first upper supply 402 according to the selection of first upper style 432. In other embodiments, other methods may be used to permit a customization of articles.

Figure 5:
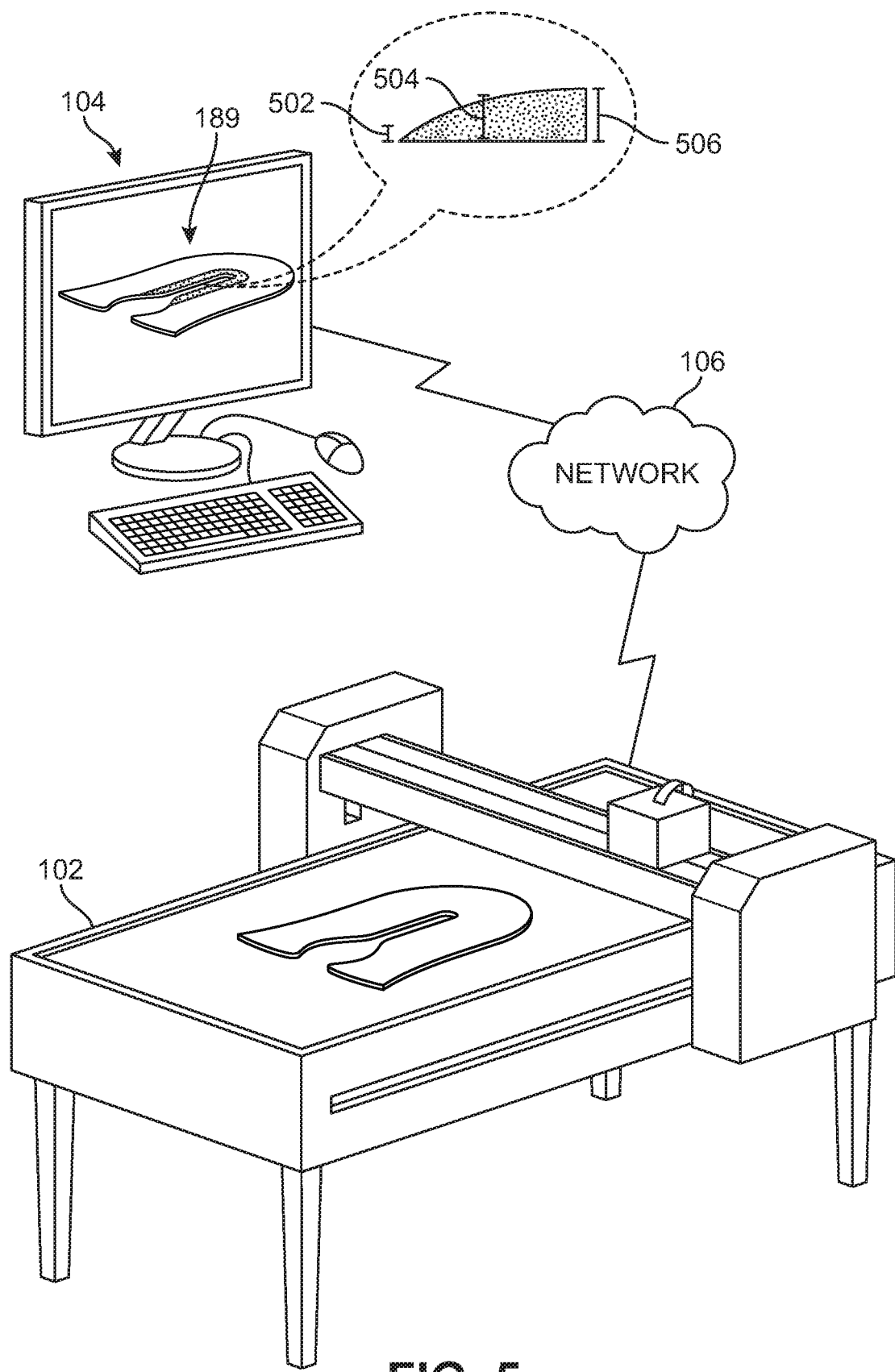
FIG. 5 shows a schematic diagram of the printing system of FIG. 4 receiving a set of predetermined thicknesses, in accordance with an exemplary embodiment.

In some embodiments, a set of predetermined thicknesses for a three-dimensional structural component may be provided, as in step 304 (see FIG. 3). In some embodiments, the set of predetermined thicknesses may be provided by a human user. Referring to FIG. 5, a human user, such as a customer or designer, may generate set of predetermined thicknesses 189 according to personal preferences using computing system 104. It should be understood that in some embodiments, at least a portion of the set of predetermined thicknesses may be automatically generated by a computing device. In the example, computing system 104 may transmit set of predetermined thicknesses 189 to printing device 102, which may be locally connected to computing system 104 or may be remotely connected to computing system 104 using network 106. In other embodiments, the set of predetermined thicknesses may be provided differently.

Generally, the set of predetermined thicknesses may have any suitable number of thicknesses to represent a shape of a three-dimensional structural component. In some embodiments, the set of predetermined thicknesses may include two thicknesses. Referring to FIG. 5, set of predetermined thicknesses 189 may include first thickness 502 and second thickness 504. As shown, first thickness 502 may be less than second thickness 504. In other instances, second thickness may be less than or equal to first thickness (not shown). In some embodiments, the set of predetermined thicknesses may optionally include more than two thicknesses. Referring to FIG. 5, set of predetermined thicknesses 189 may optionally include third thickness 506. In other embodiments, the set of predetermined thicknesses may have more than three thicknesses.

In some embodiments, the printing device may be instructed, as in step 306 (see FIG. 3) to print a single layer for the three-dimensional structural component using the set of predetermined thicknesses. The instructions may be in any suitable format and/or use any suitable topology. In some embodiments, the set of predetermined thicknesses may be converted to a three-dimensional printable file, such as a stereolithography file (STL file); in other cases, the set of predetermined thicknesses may be converted into a different design structure. In some embodiments, a set of predetermined thicknesses may use a digital image or image file. For example, a set of predetermined thicknesses may be an image file using a raster format, vector format, compound format, and/or stereo format. Examples of raster formats may include joint photographic experts group (JPEG), tagged image file format (TIFF), graphics interchange format (GIF), bitmap image file (BMP), portable networks graphics (PNG), and the like. Examples of vector formats may include computer graphics metafile (CGM), Gerber format (GERBER), scalable vector graphics (SVG), and the like. Examples of compound formats may include portable document format (PDF), encapsulated PostScript, PostScript, and the like. Examples of stereo format may include JPEG stereo (JPS), portable networks graphics (PSN), and the like. It should be understood that some image files may support multiple layers such that multiple sets of predetermined thicknesses may be stored in a single image file. In other embodiments, the instructions may be different.

Figure 6:
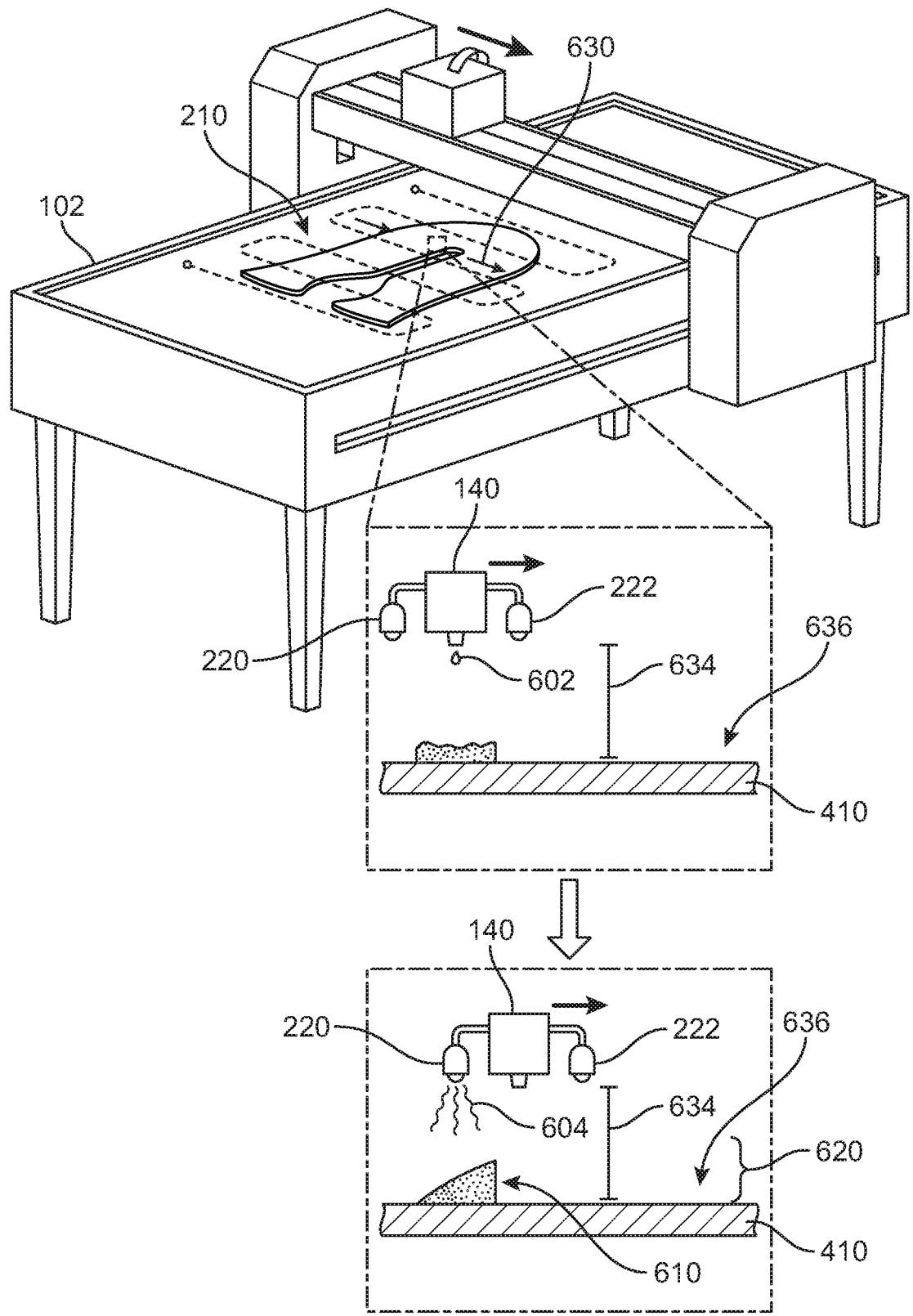
FIG. 6 shows a schematic view of dispensing a print material onto the base of FIG. 4 to form a first portion of a single layer, in accordance with an exemplary embodiment.

In some embodiments, a first portion of a single layer for the three-dimensional structural component may be printed, as in step 308 (see FIG. 3), onto the base so that the first portion has the first thickness. Referring to FIG. 6, printing device 102 may dispense print material 602 in a liquid state onto base 410. In the example, curing device 220 may emit ultraviolet light 604 onto base 410 to cure first portion 610 of single layer 620. In other embodiments, the first portion may be printed differently.

Figure 7:
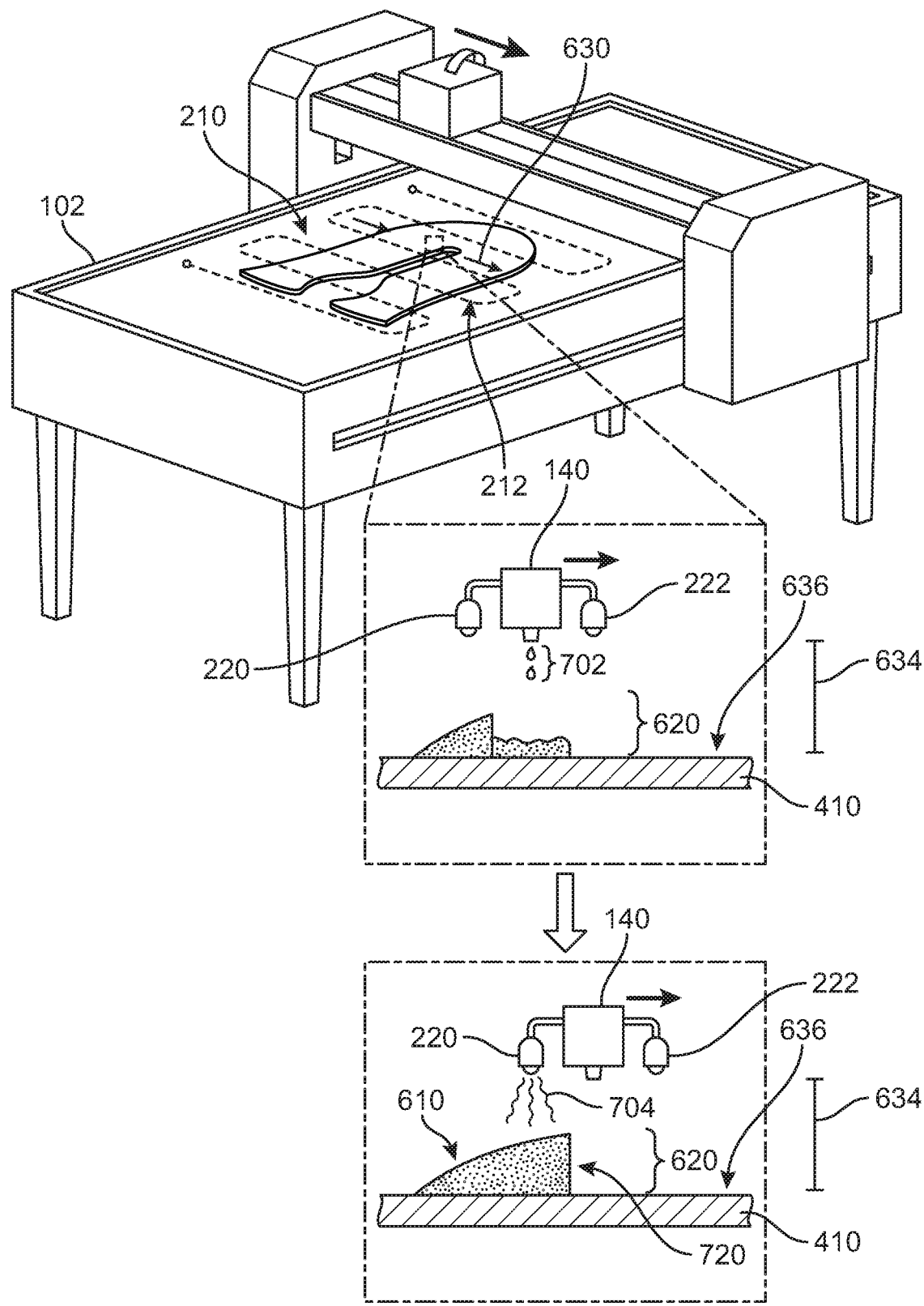
FIG. 7 shows a schematic view of dispensing a print material onto the base of FIG. 4 to form a second portion of the single layer, in accordance with an exemplary embodiment.

In some embodiments, the printing device may move the printhead assembly in a single pass for printing different portions of a single layer. Referring to FIG. 6-7, printing device 102 may move printhead assembly 140 in single pass 630 between first portion 610 and second portion 720. In the example, the single pass may be from left edge 210 to right edge 212. In other instances, the single pass may be from the right edge to the left edge (not shown). In other embodiments, the printing device may print the first portion of the single layer using multiple passes (not shown).

In some embodiments, a separation distance between an upper surface of the base and the printhead assembly may remain constant during the step of moving the printhead assembly in the single pass. Referring to FIG. 6, printing device 102 may move printhead assembly 140 parallel to upper surface 636 such that separation distance 634 between upper surface 636 and printhead assembly 140 remains constant during single pass 630. In other embodiments, the separation distance may vary during the step of moving the printhead assembly in the single pass (not shown).

Generally, the separation distance between an upper surface of the base and the printhead assembly may be any suitable distance. In some embodiments, the separation distance may be a predetermined printing parameter corresponding to the printing device. In some embodiments, the separation distance may be a design parameter determined by a human user. For example, the separation distance may be a printing step size to achieve a desired surface profile. In some embodiments, the separation distance may be automatically determined by software. For example, the separation distance may be a printing step size determined according to a received surface profile.

In some embodiments, the printing device may print the first portion of the single layer during the single pass. In some embodiments, printing the first portion of the single layer may include dispensing print material in a liquid state from the printhead assembly onto the base during the single pass. Referring to FIG. 6, printhead assembly 140 may dispense print material 602 in a liquid state from printhead assembly 140 onto base 410 during single pass 630. In some embodiments, printing the first portion of the single layer may include curing the first portion of the single layer during the single pass. Referring to FIG. 6, printhead assembly 140 may emit ultraviolet light 604 onto base 410 to cure first portion 610 of single layer 620 during single pass 630. In other embodiments, the printing device may print the first portion of the single layer using additional and/or fewer steps.

In some embodiments, a separation distance between an upper surface of the base and the printhead assembly may remain constant during the step of printing the first portion of the single layer. Referring to FIG. 6, printhead assembly 140 may dispense print material 602 using separation distance 634 between upper surface 636 and printhead assembly 140. In the example, curing device 220 may emit ultraviolet light 604 onto base 410 to cure first portion 610 of single layer 620 using separation distance 634. In other embodiments, the separation distance may vary during the step of printing the first portion of the single layer (not shown).

In some embodiments, a second portion of a single layer for the three-dimensional structural component may be printed, as in step 310 (see FIG. 3) onto the base so that the second portion has the second thickness. Referring to FIG. 7, printing device 102 may dispense print material 702 in a liquid state onto base 410. In the example, curing device 220 may emit ultraviolet light 704 onto base 410 to cure second portion 720 of single layer 620. In other embodiments, the second portion may be printed differently.

In some embodiments, the printing device may print the second portion of the single layer during the single pass. In some embodiments, printing the second portion of the single layer may include dispensing print material in a liquid state from the printhead assembly onto the base during the single pass. Referring to FIG. 7, printhead assembly 140 may dispense print material 702 in a liquid state from printhead assembly 140 onto base 410 during single pass 630. In some embodiments, printing the second portion of the single layer may include curing the second portion of the single layer during the single pass. Referring to FIG. 7, printhead assembly 140 may emit ultraviolet light 704 onto base 410 to cure second portion 720 of single layer 620 during single pass 630. In other embodiments, the printing device may print the second portion of the single layer using additional and/or fewer steps.

In some embodiments, the printing device may print an amount of print material based on the set of predetermined thicknesses. Referring to FIGS. 6-7, printing device 102 may print first portion 610 to a shorter height than second portion 720 by dispensing a smaller volume of print material for first portion 610 than second portion 720. In the example, printing device 102 may dispense print material 602 to print first portion 610, which has a smaller volume than print material 702, which is used to print second portion 720. That is, a volume of a print material printed for a portion of a layer may be selected to achieve a height of the set of predetermined thicknesses. In other embodiments, the printing device may print different thicknesses of a single layer using different methods.

In some embodiments, a separation distance between an upper surface of the base and the printhead assembly may remain constant during the step of printing the second portion of the single layer. Referring to FIG. 7, printhead assembly 140 may dispense print material 702 using separation distance 634 between upper surface 636 and printhead assembly 140. In the example, curing device 220 may emit ultraviolet light 704 onto base 410 to cure second portion 720 of single layer 620 using separation distance 634. In other embodiments, the separation distance may vary during the step of printing the second portion of the single layer (not shown).

Generally, any suitable number of portions may be printed onto a base to achieve any suitable shape of the single layer for the three-dimensional structural component. In some embodiments, such shapes may have a stepped surface (see FIG. 16). In some embodiments, such shapes may have a surface having a linear slope such as a constant increase or decrease in thickness for the three-dimensional structural component (see FIG. 21). In some embodiments, such shapes may have a surface having a non-linear slope such as a gradually increasing or decreasing of a rate of change to a thickness (see FIG. 9).

Figure 8:
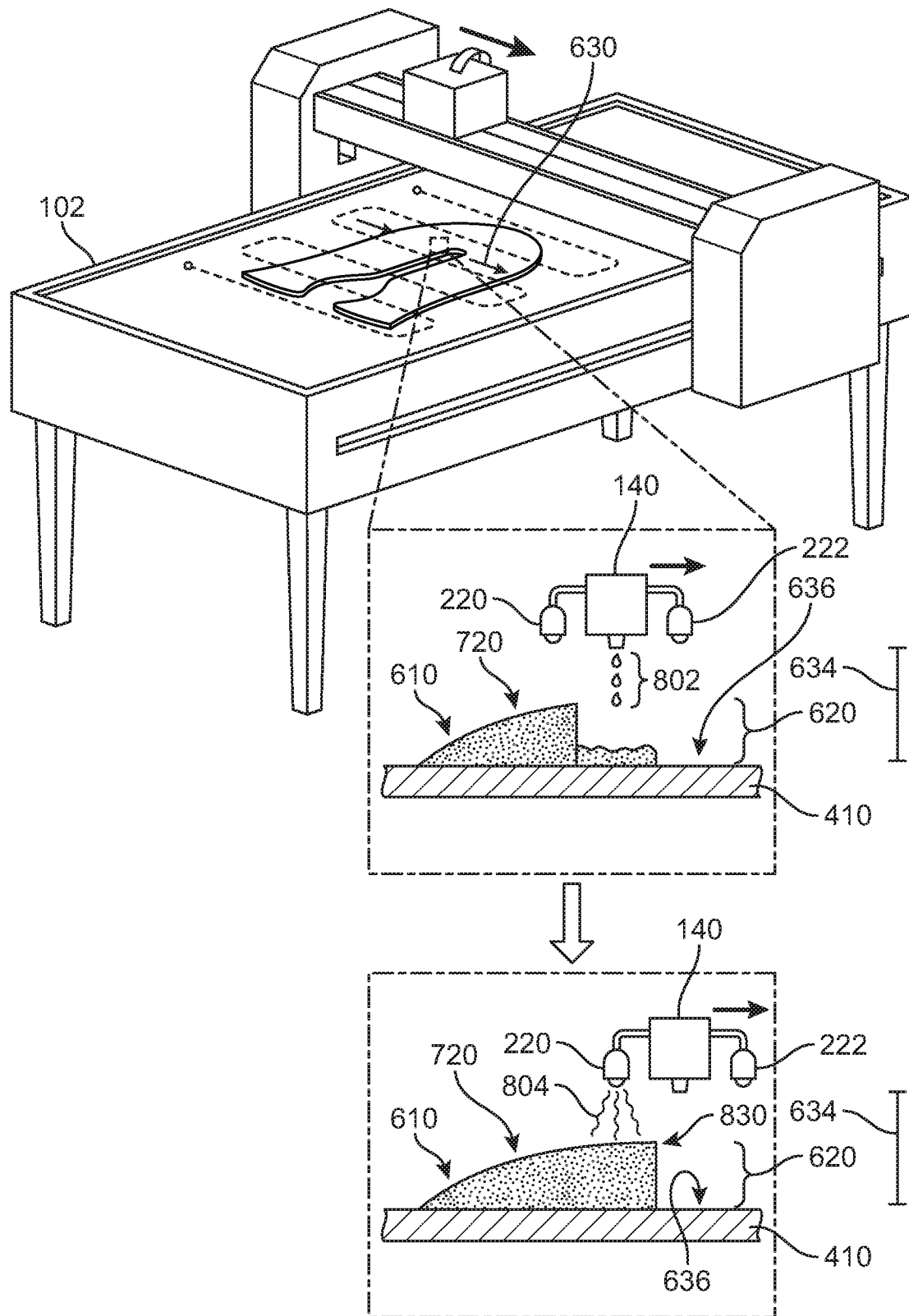
FIG. 8 shows a schematic view of dispensing a print material onto the base of FIG. 4 to form a third portion of a single layer, in accordance with an exemplary embodiment.

In some embodiments, a third portion of a single layer for the three-dimensional structural component may be optionally printed onto the base so that the third portion has a third thickness of the set of predetermined thicknesses. Referring to FIG. 8, printing device 102 may dispense print material 802 in a liquid state onto base 410. In the example, curing device 220 may emit ultraviolet light 804 onto base 410 to cure third portion 830 of single layer 620. It should be understood that an additional or fewer number of portions of the single layer may be used to form any suitable shape. In other embodiments, the third portion may be printed differently.

In some embodiments, the printing device may print the third portion of the single layer during the single pass. In some embodiments, printing the third portion of the single layer may include dispensing print material in a liquid state from the printhead assembly onto the base during the single pass. Referring to FIG. 8, printhead assembly 140 may dispense print material 802 in a liquid state from printhead assembly 140 onto base 410 during single pass 630. In some embodiments, printing the third portion of the single layer may include curing the third portion of the single layer during the single pass. Referring to FIG. 8, printhead assembly 140 may emit ultraviolet light 804 onto base 410 to cure third portion 830 of single layer 620 during single pass 630. In other embodiments, the printing device may print the third portion of the single layer using additional and/or fewer steps.

In some embodiments, a separation distance between an upper surface of the base and the printhead assembly may remain constant during the step of printing the third portion of the single layer. Referring to FIG. 8, printhead assembly 140 may dispense print material 802 using separation distance 634 between upper surface 636 and printhead assembly 140. In the example, curing device 220 may emit ultraviolet light 804 onto base 410 to cure third portion 830 of single layer 620 using separation distance 634. In other embodiments, the separation distance may vary during the step of printing the third portion of the single layer (not shown).

Figure 9:
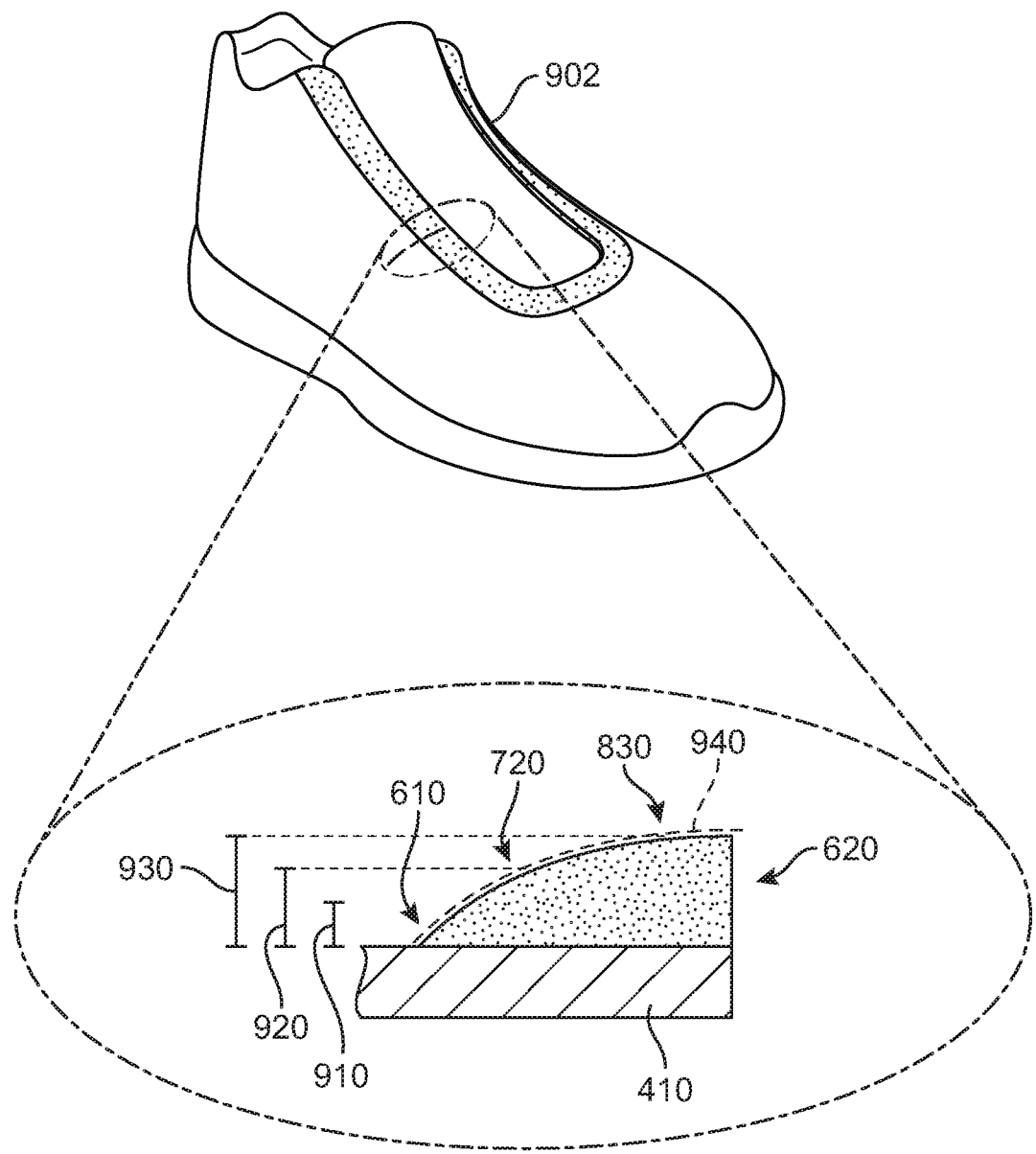
FIG. 9 shows an exemplary single layer of a three-dimensional structural component printed onto the base of FIG. 4, in accordance with an exemplary embodiment.

Generally, the various portions of the single layer may be printed having any suitable thickness. In some embodiments, the first thickness is less than the second thickness. Referring to FIG. 9, first portion 610 of single layer 620 may be printed onto base 410 so that first portion 610 has first thickness 910. In the example, second portion 720 of single layer 620 may be printed onto base 410 so that second portion 720 has second thickness 920. In the example, first thickness 910 may be less than second thickness 920. In other instances, first thickness may be greater than or equal to second thickness (not shown). Likewise, third portion 830 of single layer 620 may be printed onto base 410 so that third portion 830 has third thickness 930. In the example, second thickness 920 may be less than third thickness 930. In other instances, second thickness may be greater than or equal to third thickness (not shown).

In some embodiments, the various portions of a single layer may form an upper surface having a smoothly sloped geometry. As used herein, a smoothly sloped geometry may refer to any shape having a gradual change in shape. Such a gradual change may include linear changes and/or non-linear changes. Referring to FIG. 9, first portion 610, second portion 720, and third portion 830 may form upper surface 940 of three-dimensional structural component 902. In the example, upper surface 940 may have a rounded shape. In other embodiments, portions of a single layer may form an upper surface having a stepped geometry (see FIG. 16).

Some embodiments may permit use of multiple layers to allow a three-dimensional structural component to have different shapes. In some embodiments, use of multiple layers may permit a three-dimensional structural component to have a thicker shape (see FIG. 16). In some embodiments, use of multiple layers may permit a three-dimensional structural component to have a smooth surface contour with a large change in height (see FIG. 22).

Figure 10:
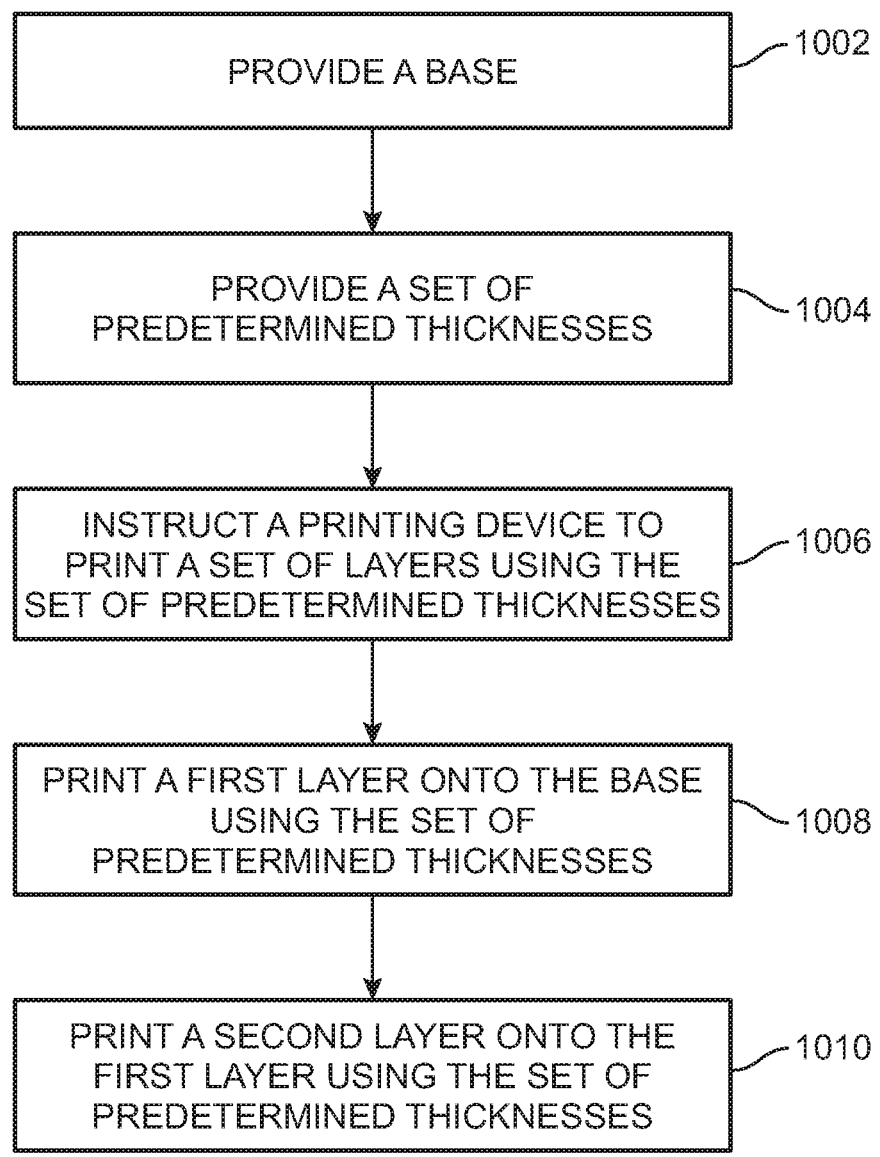
FIG. 10 shows a block diagram of a process for printing a three-dimensional structural component with multiple layers, in accordance with an exemplary embodiment.

FIG. 10 shows a block diagram of a process for printing a three-dimensional structural component onto a base, in accordance with an exemplary embodiment. The various steps of FIG. 10 may be discussed with respect to FIGS. 11-16. In some embodiments, the steps of FIG. 10 use CMYK printing. In some embodiments, the steps of FIG. 10 may use a continuous printing path. In other cases, other methods, techniques, and/or processes may be used. In some embodiments, the steps of FIG. 10 may be implemented using the system illustrated in FIG. 1. In other cases, other systems and/or devices may be used. It should be understood that additional and/or fewer steps may be used. The processes illustrated in FIGS. 11-16 are for illustrative purposes only.

Figure 11:
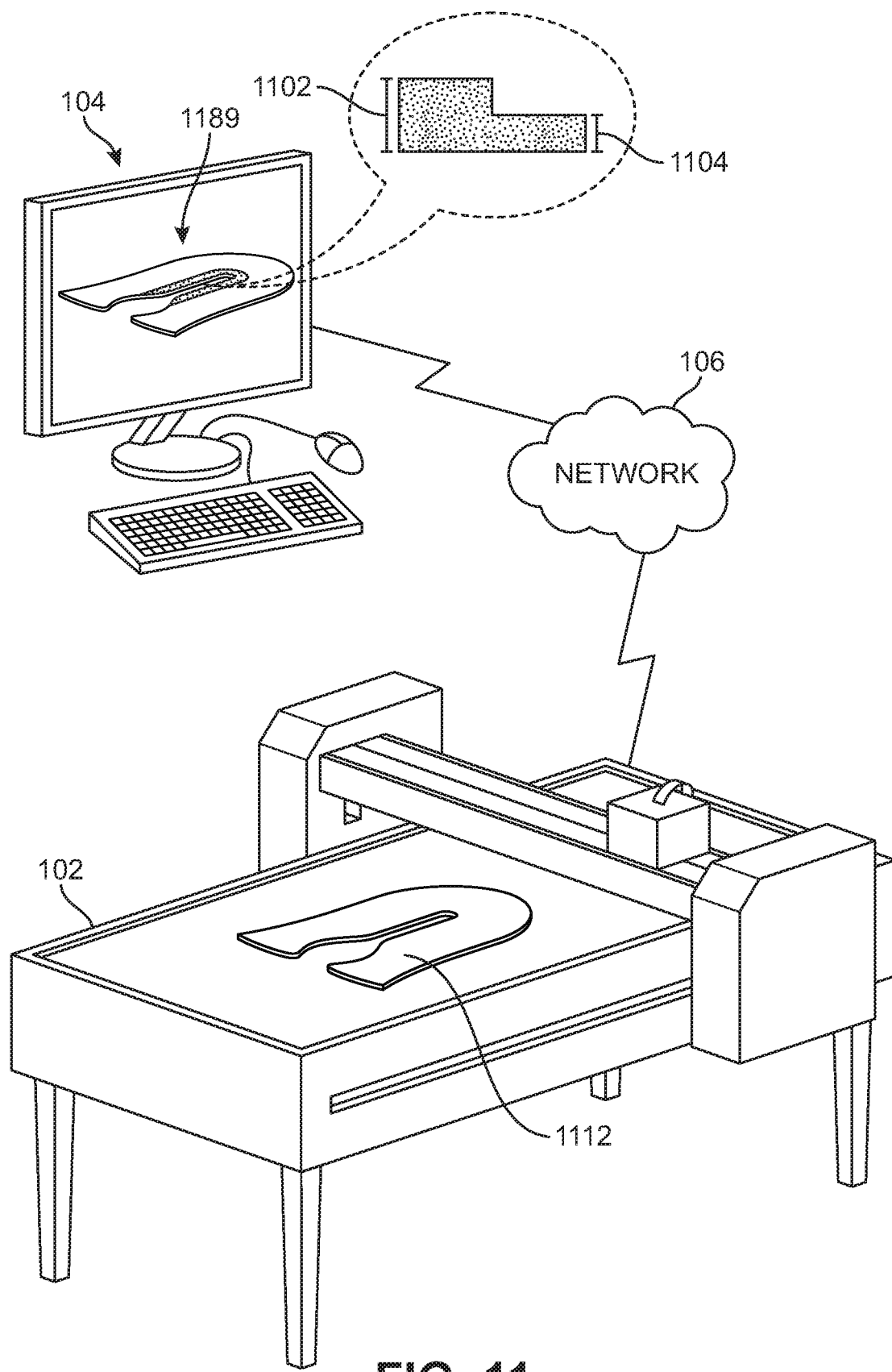
FIG. 11 shows a schematic diagram of the printing system of FIG. 1 receiving a base and receiving a set of predetermined thicknesses, in accordance with an exemplary embodiment.

In some embodiments, a base may be provided, as in step 1002 (see FIG. 10), to receive a three-dimensional structural component having a set of layers. Step 1002 may have one or more features of step 302. For example, the base may be provided manually and/or automatically. In another example, a human user may select an upper style to facilitate a customization of an article. Referring to FIG. 11, base 1112 may be provided for an upper of an article of footwear. In other embodiments, the providing of a base to receive a three-dimensional structural component having a set of layers may be provided differently from the providing of the base to receive a three-dimensional structural component having a single layer.

In some embodiments, a set of predetermined thicknesses for a three-dimensional structural component may be provided, as in step 1004 (see FIG. 10). In some embodiments, step 1004 may have one or more features of step 304. For example, the set of predetermined thicknesses may be provided by a human user and/or the set of predetermined thicknesses may be automatically generated by a computing device. Referring to FIG. 11, set of predetermined thicknesses 1189 may include first thickness 1102 and second thickness 1104. As shown, first thickness 1102 may be greater than second thickness 1104. In other instances, second thickness may be greater than first thickness (not shown). In some embodiments, the set of predetermined thicknesses may optionally include more than two thicknesses (not shown). In other embodiments, the providing of the set of predetermined thicknesses to receive a three-dimensional structural component having a set of layers may be provided differently from the providing of the set of predetermined thicknesses to receive a three-dimensional structural component having a single layer.

In some embodiments, the printing device may be instructed, as in step 1006 (see FIG. 10) to print a set of layers for the three-dimensional structural component using the set of predetermined thicknesses. In some embodiments, step 1006 may have one or more features of step 306. For example, the set of predetermined thicknesses may be converted to a three-dimensional printable file. In another example, the set of predetermined thicknesses may use a digital image or image file. Referring to FIG. 11, computing system 104 may transmit set of predetermined thicknesses 1189 to printing device 102, which may be locally connected to computing system 104 or may be remotely connected to computing system 104 using network 106. In other embodiments, instructing the printing device to print a set of layers may be different than instructing the printing device to print a single layer.

Figure 12:
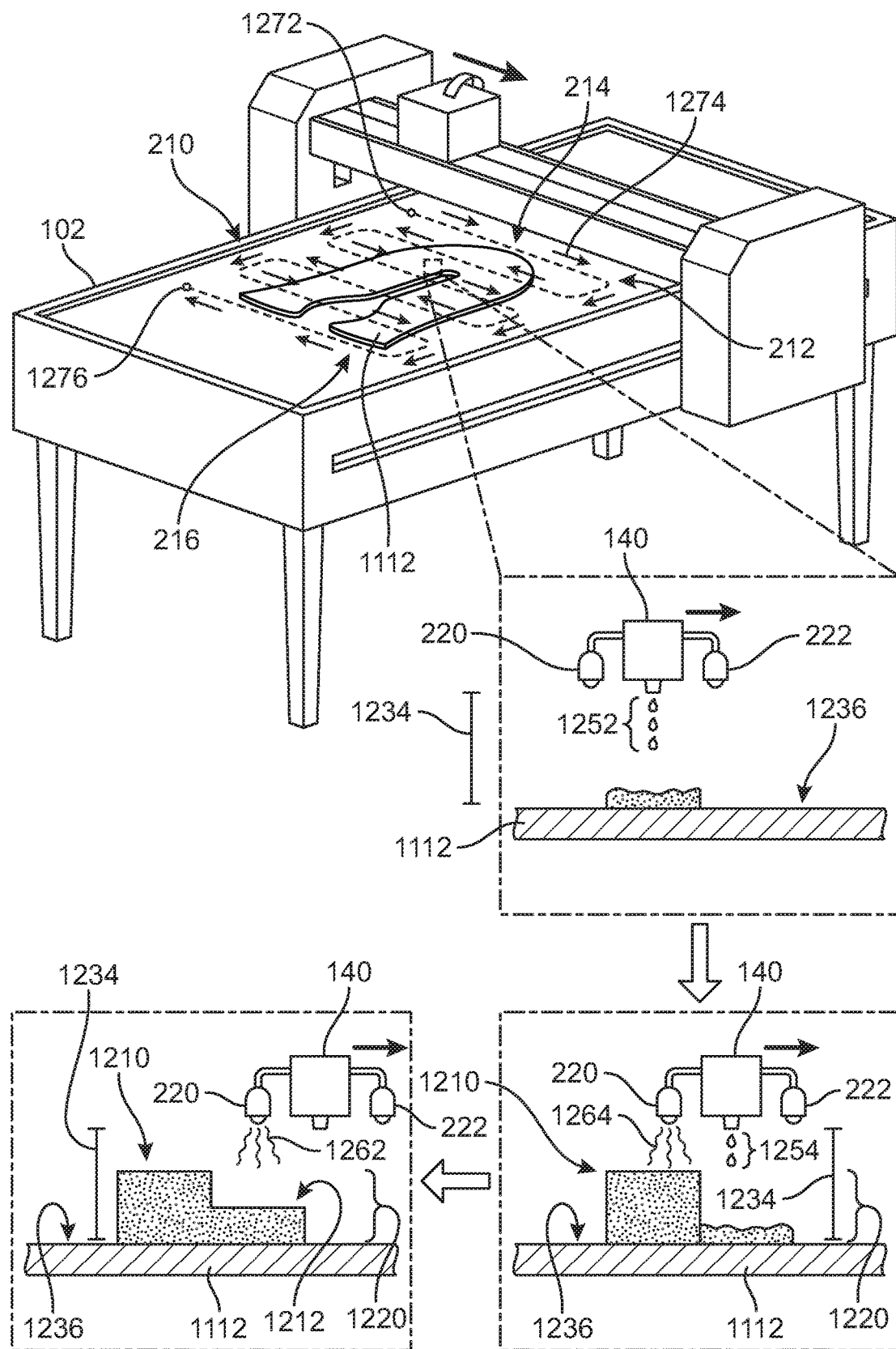
FIG. 12 shows a schematic view of dispensing a print material onto the base of FIG. 11 to form a first layer, in accordance with an exemplary embodiment.

In some embodiments, the printing device may move the printhead assembly along a first continuous printing path to print the first layer. Generally, the first continuous printing path may start and conclude at any suitable position of the base. Referring to FIG. 12, first continuous printing path 1274 may begin at starting point 1272 and conclude at ending point 1276. In the example, starting point 1272 may be positioned at left edge 210 and top edge 214. In the example, ending point 1276 may be positioned at right edge 212 and bottom edge 216. In other instances, the first continuous printing path may be positioned differently with the base.

In some embodiments, a first layer for the three-dimensional structural component may be printed, as in step 1008 (see FIG. 10) onto the base using the set of predetermined thicknesses. In some embodiments, step 1008 may have one or more features of step 308. For example, the printing device may move the printhead assembly in a single pass (e.g., left edge to right edge) for printing different portions of the first layer. In another example, printing a portion of the first layer may include dispensing print material in a liquid state from the printhead assembly onto the base during the single pass and curing the portion of the first layer during a single pass. In another example, the printing device may print an amount of print material based on the set of predetermined thicknesses. In another example, a separation distance between an upper surface of the base and the printhead assembly may remain constant during the step of printing the first layer. Referring to FIG. 12, printhead assembly 140 may dispense print material 1252 in a liquid state from printhead assembly 140 onto base 1112 during first continuous printing path 1274. In the example, curing device 220 may emit ultraviolet light 1262 onto base 1112 to cure first portion 1210 of first layer 1220 during first continuous printing path 1274. In the example, printhead assembly 140 may dispense print material 1254 in a liquid state from printhead assembly 140 onto base 1112 during first continuous printing path 1274. In the example, curing device 220 may emit ultraviolet light 1264 onto base 1112 to cure second portion 1212 of first layer 1220 during first continuous printing path 1274. In other embodiments, printing the first layer of a set of layers may be different than printing a single layer.

Some embodiments of the printing system can include provisions that permit printing directly onto the article. In some embodiments, the first layer may be printed directly onto the base. Referring to FIG. 12, first layer 1220 may be printed directly onto base 1112. In other embodiments, the three-dimensional structural component may be first printed onto a release layer and then transferred onto the base (not shown).

In some embodiments, a separation distance between an upper surface of the base and the printhead assembly may remain constant during the step of printing the first layer. Referring to FIG. 12, printing device 102 may move printhead assembly 140 parallel to upper surface 1236 such that separation distance 1234 between upper surface 1236 and printhead assembly 140 remains constant during first continuous printing path 1274. In other embodiments, the separation distance may vary during the step of printing the first layer (not shown).

Figure 13:
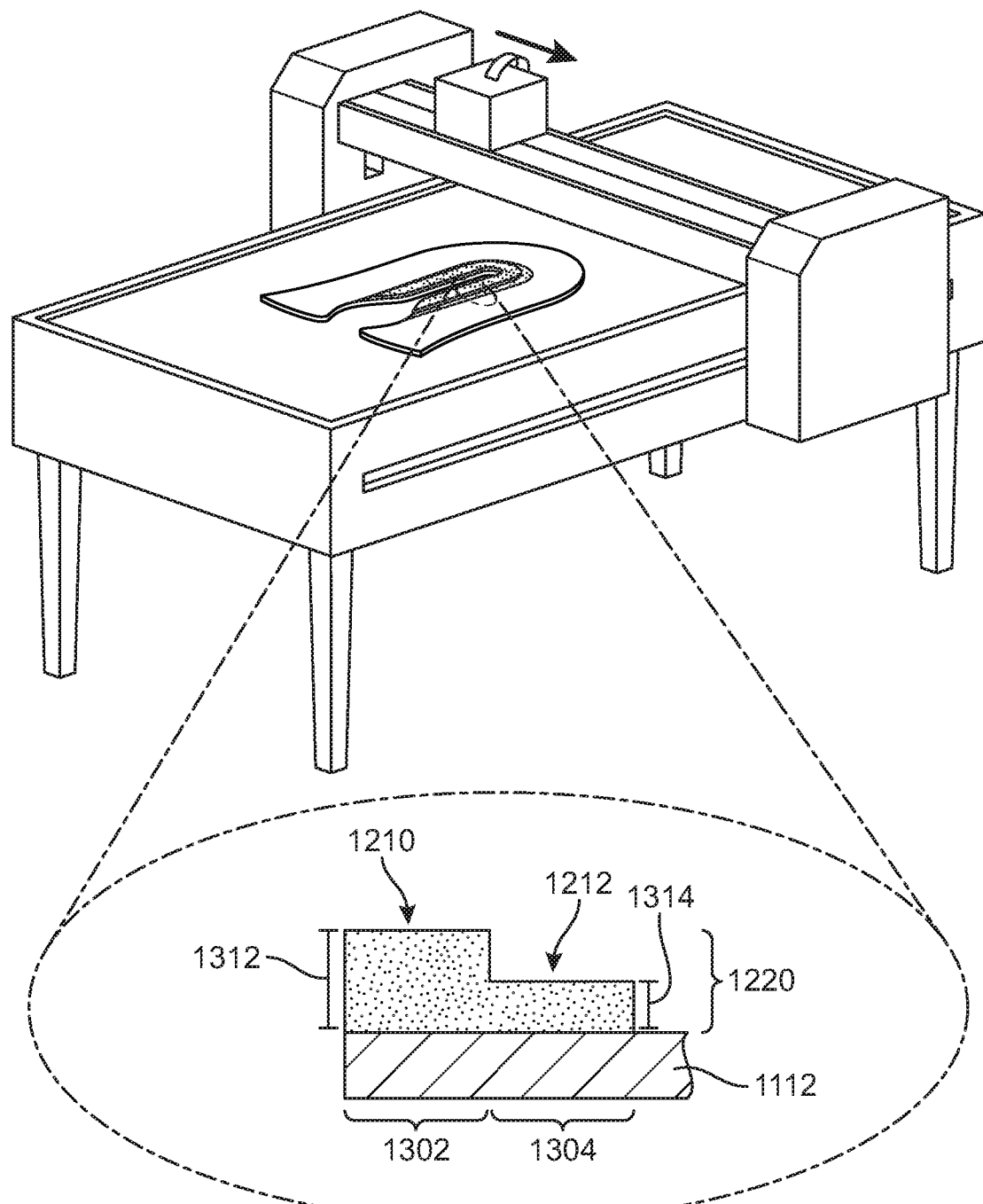
FIG. 13 shows the first layer of FIG. 12, in accordance with an exemplary embodiment.

Some embodiments permit the first layer that may be printed to have different thicknesses at various positions of the base according to the set of predetermined set of thicknesses. In some embodiments, the first layer may be printed to have the first thickness at a first position of the base. Referring to FIG. 13, first layer 1220 may have thickness 1312 at first position 1302 that is equal to first thickness 1102 of set of predetermined thicknesses 1189 (see FIG. 11). In some embodiments, the first layer may be printed to have the second thickness at a second position of the base. In the example, first layer 1220 may have thickness 1314 at second position 1304 that is equal to second thickness 1104 of set of predetermined thicknesses 1189 (see FIG. 11). It should be understood that the various portions of the first layer may be printed having any suitable thickness. In the example, thickness 1312 may be greater than thickness 1314. In other embodiments, the thickness at the first position may be less than or equal to the thickness at the second position (not shown).

Figure 14:
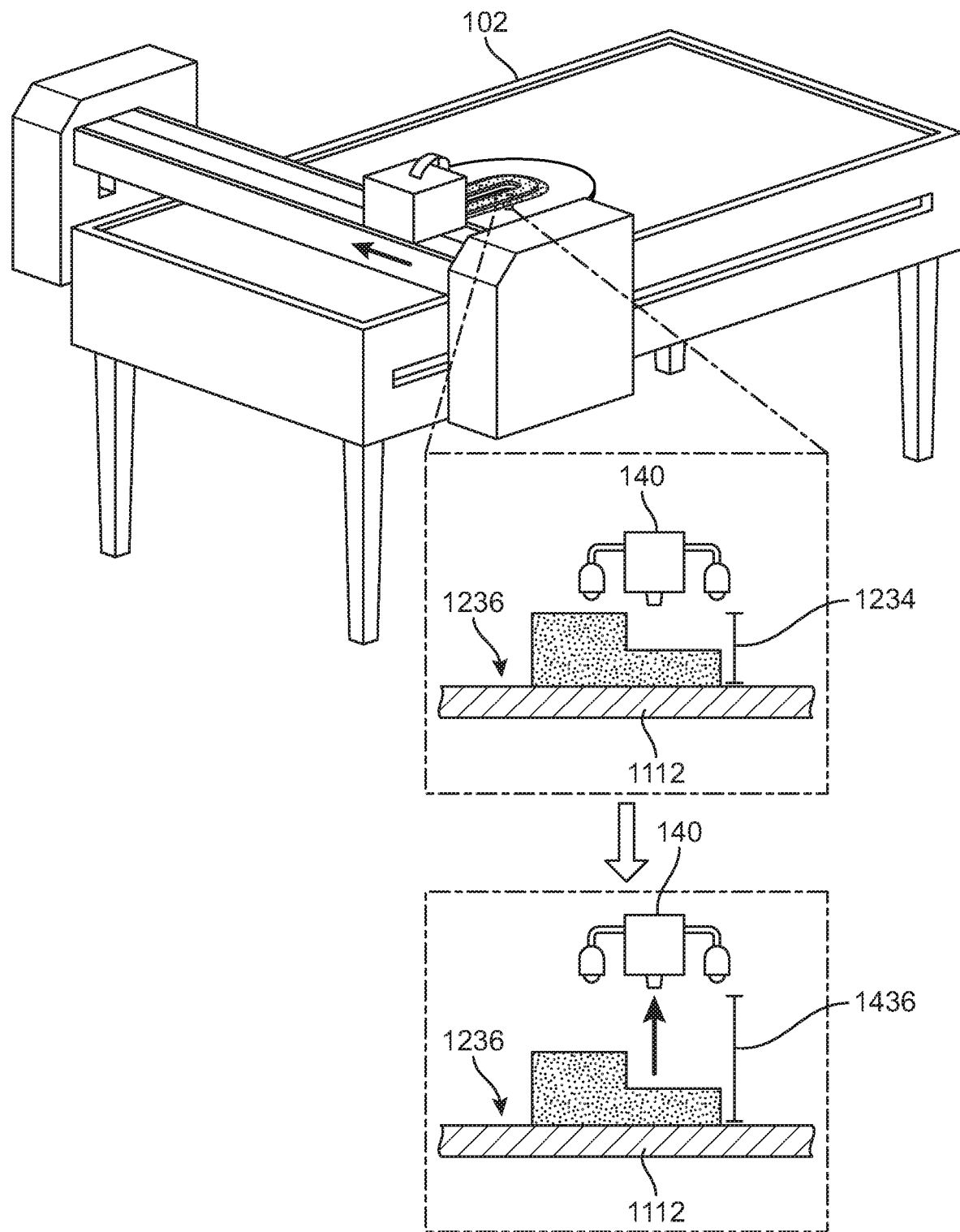
FIG. 14 shows positioning a printhead assembly of the printing system for printing a second layer onto the first layer of FIG. 12, in accordance with an exemplary embodiment.

In some embodiments, a separation distance between an upper surface of the base and the printhead assembly during the step of printing the first layer may change after printing the first layer. Referring to FIG. 14, printing device 102 may elevate printhead assembly 140 in a direction perpendicular to upper surface 1236 from separation distance 1234 to separation distance 1436. In the example, separation distance 1436 is between upper surface 1236 and printhead assembly 140. In other embodiments, the separation distance may remain constant after the step of printing the first layer (not shown).

Figure 15:
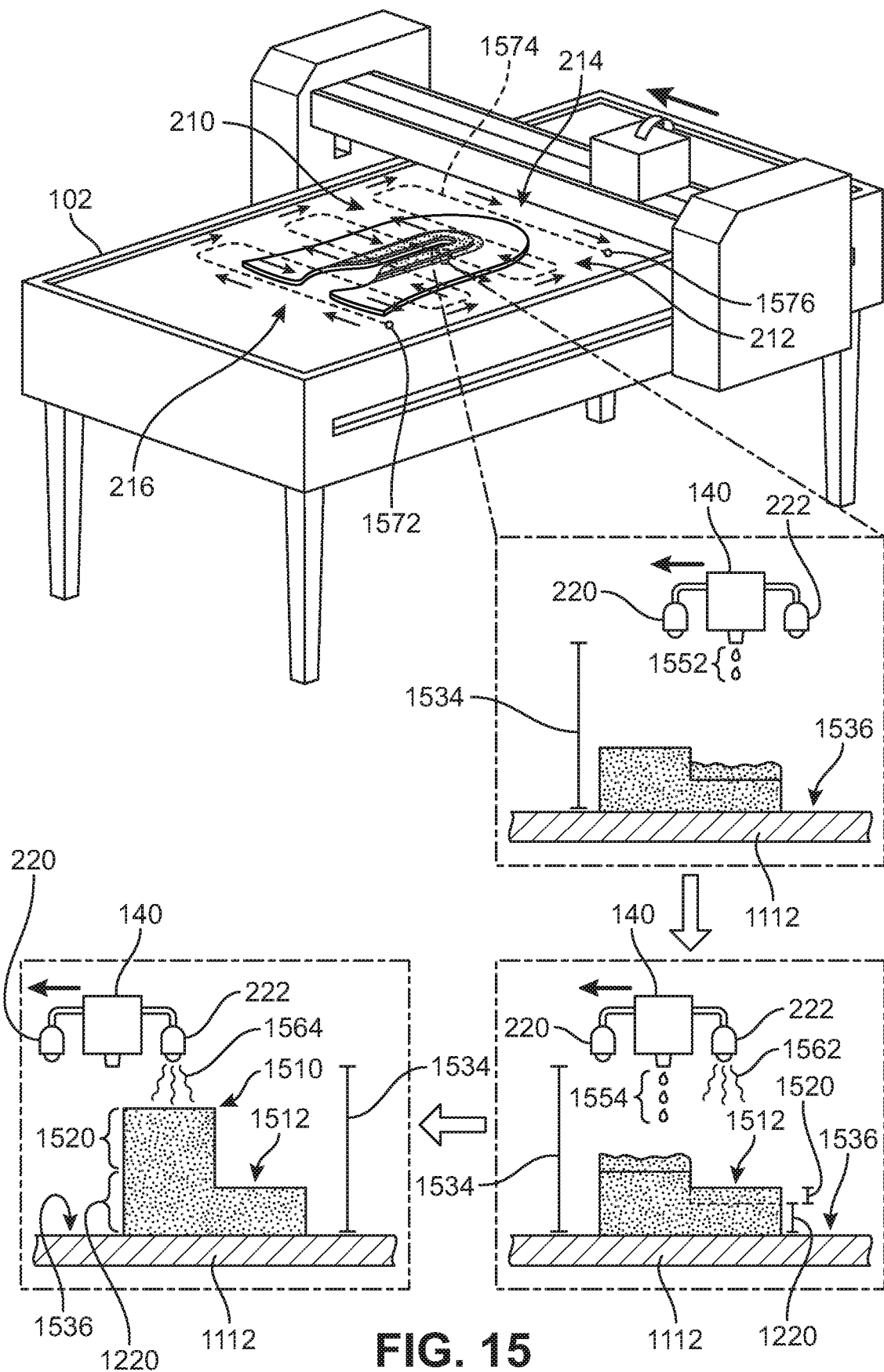
FIG. 15 shows a schematic view of dispensing a print material onto the first layer of FIG. 12 to form a second layer, in accordance with an exemplary embodiment.

In some embodiments, the printing device may move the printhead assembly along a second continuous printing path to print the second layer. Generally, the second continuous printing path may start and conclude at any suitable position of the base. Referring to FIG. 15, second continuous printing path 1574 may begin at starting point 1572 and conclude at ending point 1576. In the example, starting point 1572 may be positioned at right edge 212 and bottom edge 216. In the example, ending point 1576 may be positioned at left edge 210 and top edge 214. In other instances, the second continuous printing path may be positioned differently with the base.

In some embodiments, a second layer for the three-dimensional structural component may be printed, as in step 1010 (see FIG. 10), onto the first layer using the set of predetermined thicknesses. In some embodiments, step 1010 may have one or more features of step 308. For example, the printing device may move the printhead assembly in a single pass (e.g., left edge to right edge) for printing different portions of the second layer. In another example, printing a portion of the second layer may include dispensing print material in a liquid state from the printhead assembly during the second pass and curing the portion of the second layer during the second pass. In another example, the printing device may print an amount of print material based on the set of predetermined thicknesses. In another example, a separation distance between an upper surface of the base and the printhead assembly may remain constant during the step of printing the second layer. Referring to FIG. 15, printhead assembly 140 may dispense print material 1552 in a liquid state from printhead assembly 140 onto first layer 1220 during second continuous printing path 1574. In the example, curing device 222 may emit ultraviolet light 1562 onto first layer 1220 to cure second portion 1512 of second layer 1520 during second continuous printing path 1574. In the example, printhead assembly 140 may dispense print material 1554 in a liquid state from printhead assembly 140 onto first layer 1220 during second continuous printing path 1574. In the example, curing device 222 may emit ultraviolet light 1564 onto first layer 1220 to cure first portion 1510 of second layer 1520 during second continuous printing path 1574. In other embodiments, the printing of a second layer of a set of layers may be different than the printing of a single layer.

Generally, the step of printing the second layer may be initiated at any suitable time after printing the first layer. In some embodiments, the step of printing the second layer may be initiated after printing the first layer. Referring to FIGS. 13 and 15, first portion 1210 of first layer 1220 may be cured before print material 1552 and/or print material 1554 for second layer 1520 is dispensed. In the example, second portion 1212 of first layer 1220 may be cured before print material 1552 and/or print material 1554 for second layer 1520 is dispensed. In some embodiments, the step of printing the second layer may be initiated after the printhead assembly is moved the first continuous printing path (see FIG. 12). In some embodiments, the step of printing the second layer may be initiated after a separation distance between an upper surface of the base and the printhead assembly is modified (see FIG. 14).

In some embodiments, the separation distance between an upper surface of the base and the printhead assembly may remain constant during the step of printing the second layer. Referring to FIG. 15, printing device 102 may move printhead assembly 140 parallel to upper surface 1536 such that separation distance 1534 between upper surface 1536 and printhead assembly 140 remains constant during second continuous printing path 1574. In other embodiments, the separation distance may vary during the step of printing the second layer (not shown).

Figure 16:
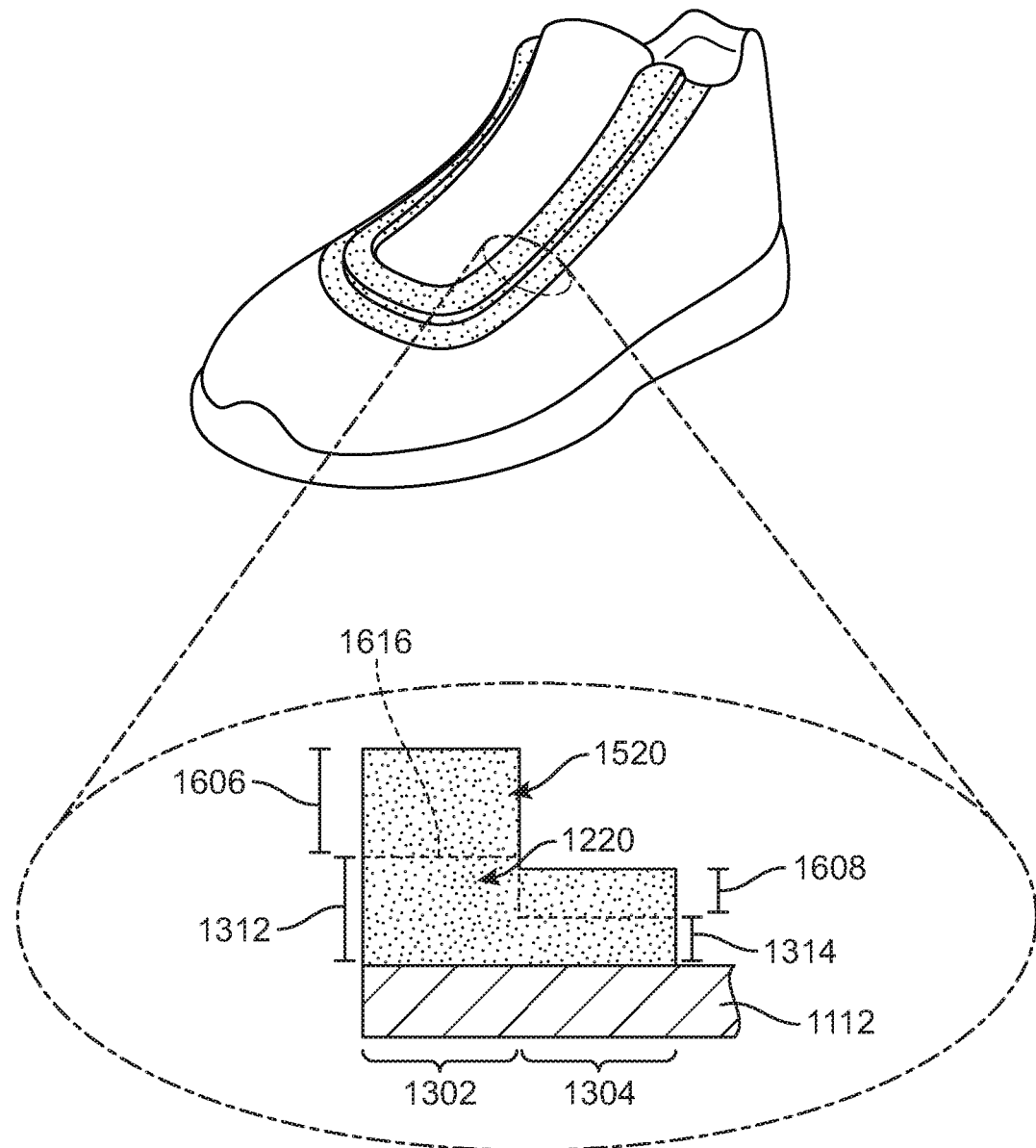
FIG. 16 shows the second layer of FIG. 15, in accordance with an exemplary embodiment.

In some embodiments, the first layer and the second layer may be printed to have a thickness at a position of the base that is equal to a corresponding thickness of the set of predetermined thicknesses. Referring to FIG. 16, first layer 1220 may be printed having thickness 1312 at first position 1302 of base 1112 that is equal to first thickness 1102 of set of predetermined thicknesses 1189 (see FIG. 11). In the example, second layer 1520 may be printed having thickness 1606 at first position 1302 of base 1112 that is equal to first thickness 1102 of set of predetermined thicknesses 1189 (see FIG. 11). Likewise, first layer 1220 may be printed having thickness 1314 at second position 1304 of base 1112 that is equal to second thickness 1104 of set of predetermined thicknesses 1189 (see FIG. 11). In the example, second layer 1520 may be printed having thickness 1608 at second position 1304 of base 1112 that is equal to second thickness 1104 of set of predetermined thicknesses 1189 (see FIG. 11). In other embodiments, different layers of the three-dimensional structure may be printed to have different thicknesses.

In some embodiments, the printed set of layers of the three-dimensional structural component may have a combined thickness at a position of the base that is less than the separation distance used to print the first layer. Referring to FIG. 16, first layer 1220 may be printed having thickness 1314 at second position 1304 of base 1112. In the example, second layer 1520 may be printed having thickness 1608 at second position 1304 of base 1112. In the example, a combined thickness of thickness 1314 and thickness 1608 may be less than separation distance 1234 (see FIG. 12) used when printing the first layer 1220.

In some embodiments, the printed set of layers of the three-dimensional structural component may have a combined thickness at a position of the base that is greater than the separation distance used to print the first layer. Referring to FIG. 16, first layer 1220 may be printed having thickness 1312 at first position 1302 of base 1112. In the example, second layer 1520 may be printed having thickness 1606 at first position 1302 of base 1112. In the example, a combined thickness of thickness 1312 and thickness 1606 may be greater than separation distance 1234 (see FIG. 12).

In some embodiments, portions of the first layer may extend further from the base than portions of the second layer. Referring to FIG. 16, first layer 1220 at first position 1302 may extend away from base 1112 further than second layer 1520 at second position 1304. In other embodiments, each portion of the second layer may extend further from the base than the first layer (not shown).

In some embodiments, the second layer may cover at least a portion of an upper surface of the first layer. Referring to FIG. 16, second layer 1520 may completely cover upper surface 1616 of first layer 1220 at first position 1302. In the example, second layer 1520 may completely cover upper surface 1616 of first layer 1220 at second position 1304. In other embodiments, portions of the first layer may remain exposed after printing the subsequent layers (not shown).

Figure 17:
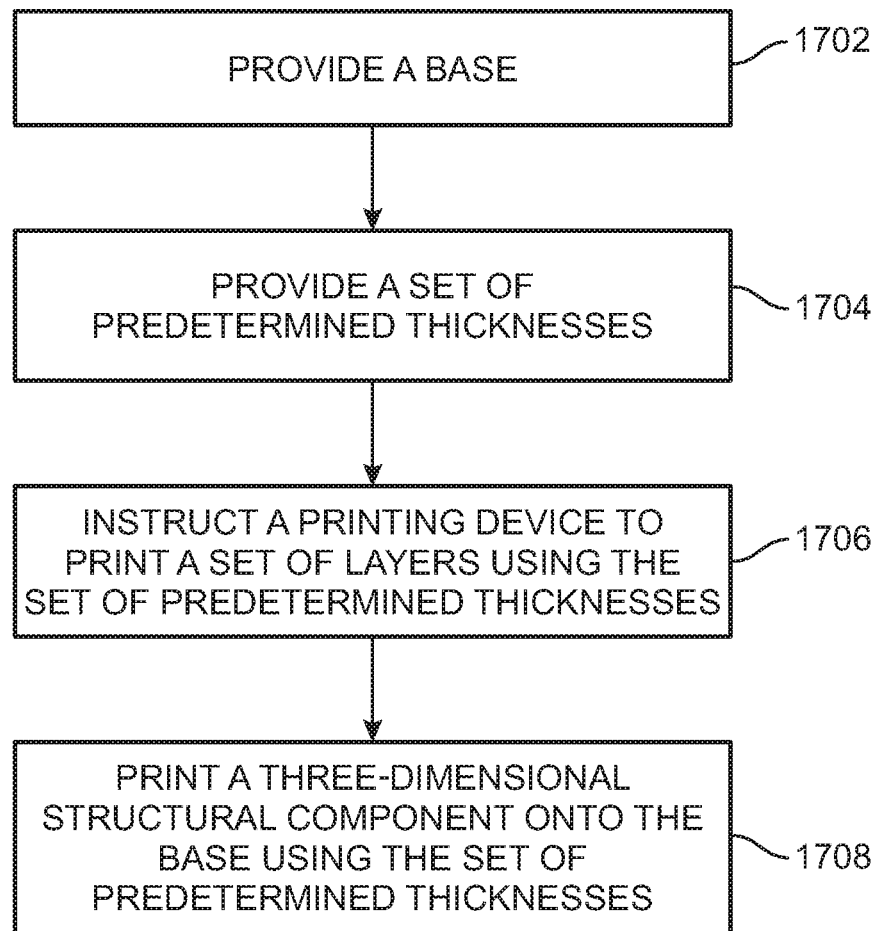
FIG. 17 shows a block diagram of a process for printing a three-dimensional structural component with multiple layers for forming a three-dimensional structural component having a smooth slope, in accordance with an exemplary embodiment.

FIG. 17 shows a block diagram of a process for printing a three-dimensional structural component onto a base, in accordance with an exemplary embodiment. The various steps of FIG. 17 may be discussed with respect to FIGS. 18-22. In some embodiments, the steps of FIG. 17 use CMYK printing. In some embodiments, the steps of FIG. 17 may use a continuous printing path. In other cases, other methods, techniques, and/or processes may be used. In some embodiments, the steps of FIG. 17 may be implemented using the system illustrated in FIG. 1. In other cases, other systems and/or devices may be used. It should be understood that additional and/or fewer steps may be used. The processes illustrated in FIGS. 18-22 are for illustrative purposes only.

Figure 18:
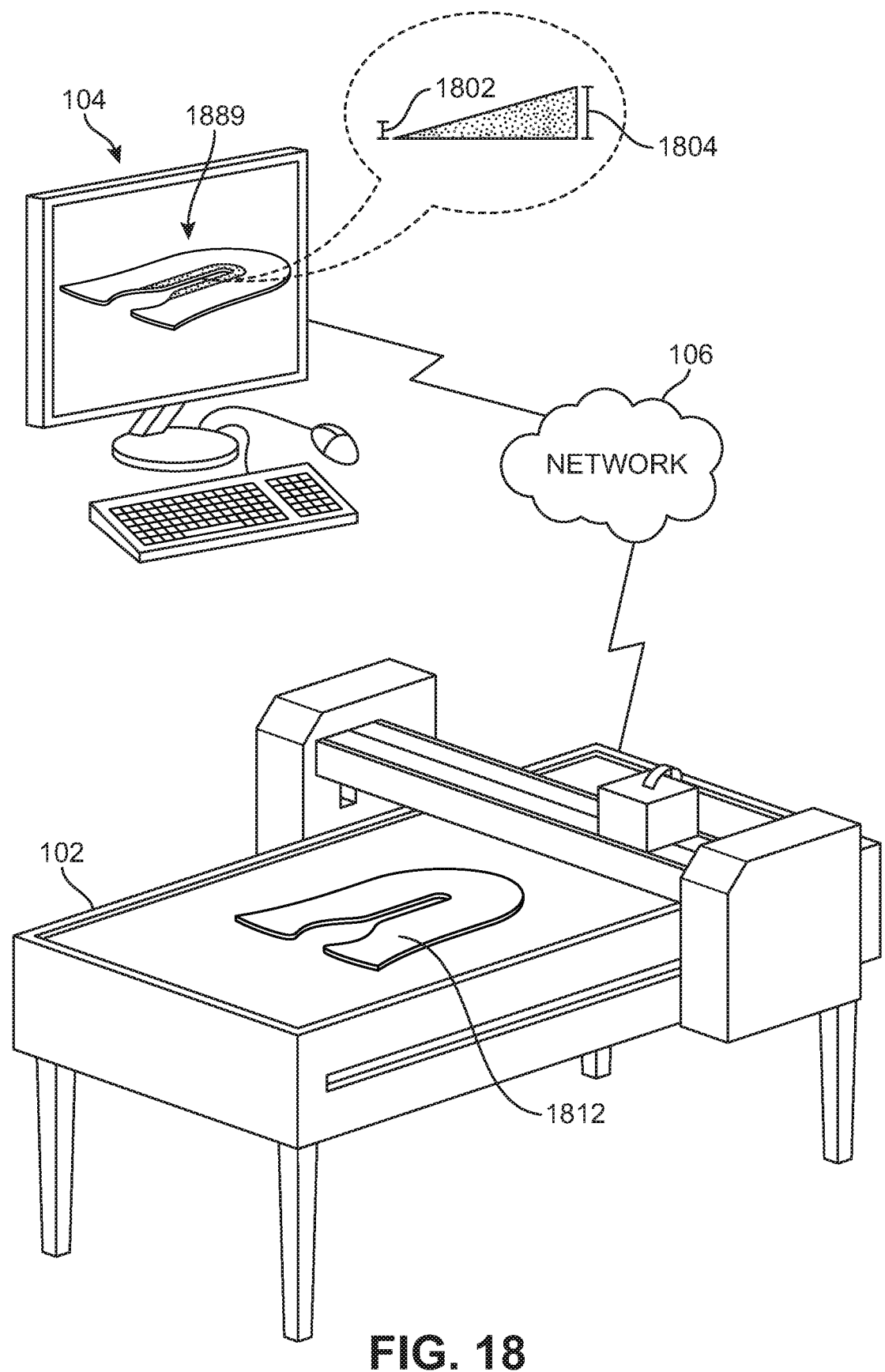
FIG. 18 shows a schematic diagram of the printing system of FIG. 1 receiving a base and receiving a set of predetermined thicknesses, in accordance with an exemplary embodiment.

In some embodiments, a base may be provided, as in step 1702 (see FIG. 17), to receive a three-dimensional structural component having a set of layers. Step 1702 may have one or more features of step 302. For example, the base may be provided manually and/or automatically. In another example, a human user may select an upper style to facilitate a customization of an article. Referring to FIG. 18, base 1812 may be provided for an upper of an article of footwear. In other embodiments, the providing of a base to receive a three-dimensional structural component having a set of layers may be provided differently from the providing of the base to receive a three-dimensional structural component having a single layer.

In some embodiments, a set of predetermined thicknesses for a three-dimensional structural component may be provided, as in step 1704 (see FIG. 17). In some embodiments, step 1704 may have one or more features of step 304. For example, the set of predetermined thicknesses may be provided by a human user and/or the set of predetermined thicknesses may be automatically generated by a computing device. Referring to FIG. 18, set of predetermined thicknesses 1889 may include first thickness 1802 and second thickness 1804. As shown, first thickness 1802 may be less than second thickness 1804. In other instances, first thickness may be greater than second thickness (not shown). In some embodiments, the set of predetermined thicknesses may optionally include more than two thicknesses (not shown). In other embodiments, the providing of the set of predetermined thicknesses to receive a three-dimensional structural component having a set of layers may be provided differently from the providing of the set of predetermined thicknesses to receive a three-dimensional structural component having a single layer.

In some embodiments, the printing device may be instructed, as in step 1706 (see FIG. 17), to print a set of layers for the three-dimensional structural component using the set of predetermined thicknesses. In some embodiments, step 1706 may have one or more features of step 306. For example, the set of predetermined thicknesses may be converted to a three-dimensional printable file. In another example, the set of predetermined thicknesses may use a digital image or image file. Referring to FIG. 18, computing system 104 may transmit set of predetermined thicknesses 1889 to printing device 102, which may be locally connected to computing system 104 or may be remotely connected to computing system 104 using network 106. In other embodiments, instructing the printing device to print a set of layers may be different than instructing the printing device to print a single layer.

In some embodiments, a three-dimensional structural component is printed, as in step 1708, onto the base using the set of predetermined thicknesses. The three-dimensional structural component may be printed using any suitable number of layers. Although FIGS. 19-22 show two layers, it should be understood that more than two layers may be printed to form the three-dimensional structural component.

In some embodiments, a first layer for the three-dimensional structural component may be printed onto the base using the set of predetermined thicknesses. In some embodiments, the printing of a first layer for a three-dimensional structural component having a smoothly sloped geometry may have one or more features of the printing of a three-dimensional structural component having multiple layers. For example, the printing device may move the printhead assembly in a single pass (e.g., left edge to right edge) for printing different portions of the first layer. In another example, the printing device may move the printhead assembly in a continuous printing path. In another example, printing a portion of the first layer may include dispensing print material in a liquid state from the printhead assembly onto the base during the single pass and curing the portion of the first layer during the single pass. In another example, the printing device may print an amount of print material based on the set of predetermined thicknesses. In another example, a separation distance between an upper surface of the base and the printhead assembly may remain constant during the step of printing the first layer. Referring to FIG.

19, printhead assembly 140 may dispense print material 1952 in a liquid state from printhead assembly 140 onto base 1812 during first continuous printing path 1974. In the example, curing device 220 may emit ultraviolet light 1962 onto base 1812 to cure first portion 1910 of first layer 1920. In the example, printhead assembly 140 may dispense print material 1954 in a liquid state from printhead assembly 140 onto base 1812. In the example, curing device 220 may emit ultraviolet light 1964 onto base 1812 to cure second portion 1912 of first layer 1920. In other embodiments, the printing of a first layer of a set of layers may be different than the printing of a single layer.

Figure 19:
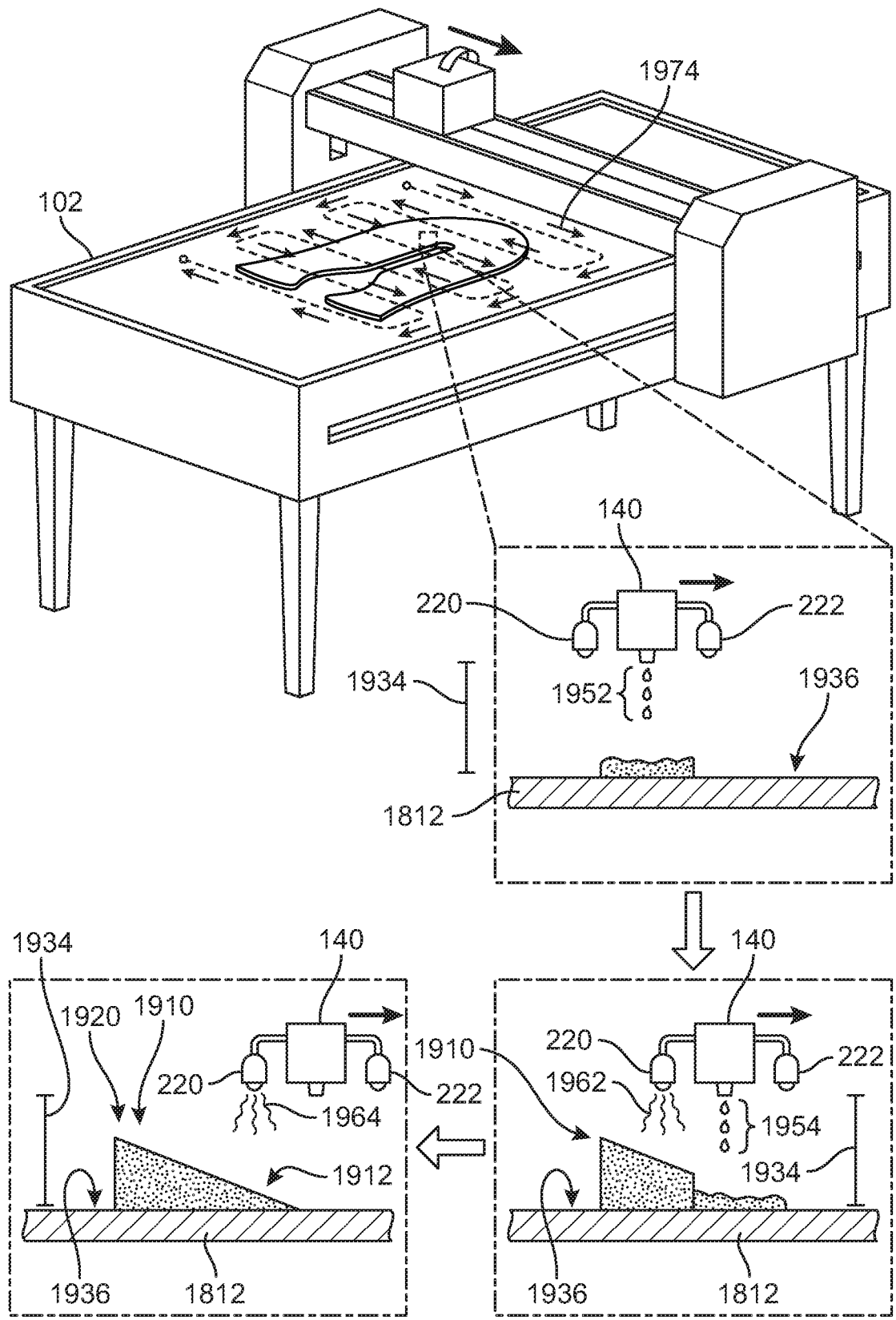
FIG. 19 shows a schematic view of dispensing a print material onto the base of FIG. 18 to form a first layer, in accordance with an exemplary embodiment.

In some embodiments, a separation distance between an upper surface of the base and the printhead assembly may remain constant during the step of printing the first layer. Referring to FIG. 19, printing device 102 may move printhead assembly 140 parallel to upper surface 1936 of base 1812 such that separation distance 1934 between upper surface 1936 and printhead assembly 140 remains constant during first continuous printing path 1974. In other embodiments, the separation distance may vary during the step of printing the first layer (not shown).

Figure 20:
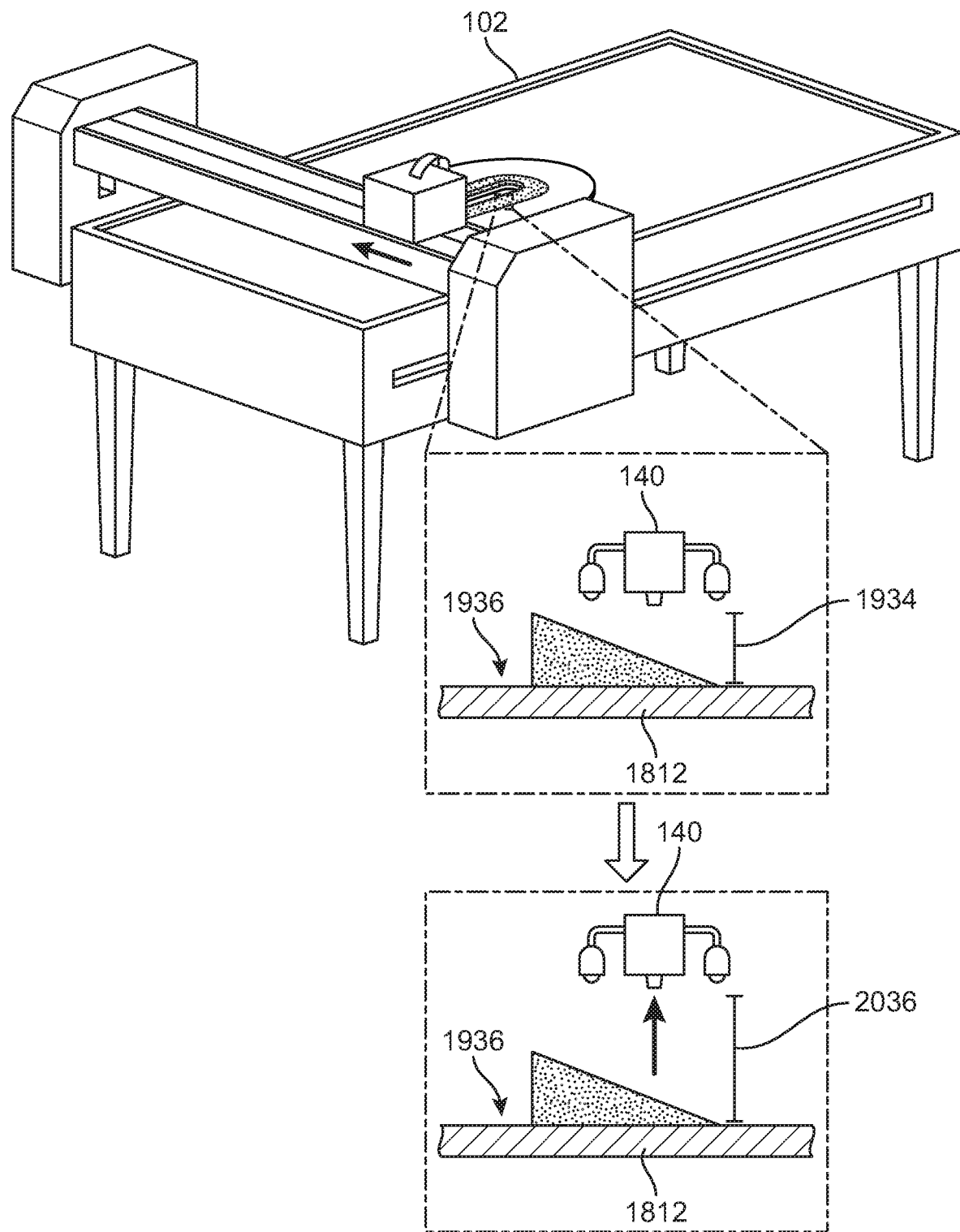
FIG. 20 shows the first layer of FIG. 19 and positioning a printhead assembly of the printing system for printing a second layer onto the first layer of FIG. 19, in accordance with an exemplary embodiment.

In some embodiments, a separation distance between an upper surface of the base and the printhead assembly during the step of printing the first layer may change after printing the first layer. Referring to FIG. 20, printing device 102 may elevate printhead assembly 140 perpendicular to upper surface 1936 from separation distance 1934 between upper surface 1936 of base 1812 and printhead assembly 140 to separation distance 2036 between upper surface 1936 of base 1812 and printhead assembly 140. In other embodiments, the separation distance may remain constant after the step of printing the first layer (not shown).

Figure 21:
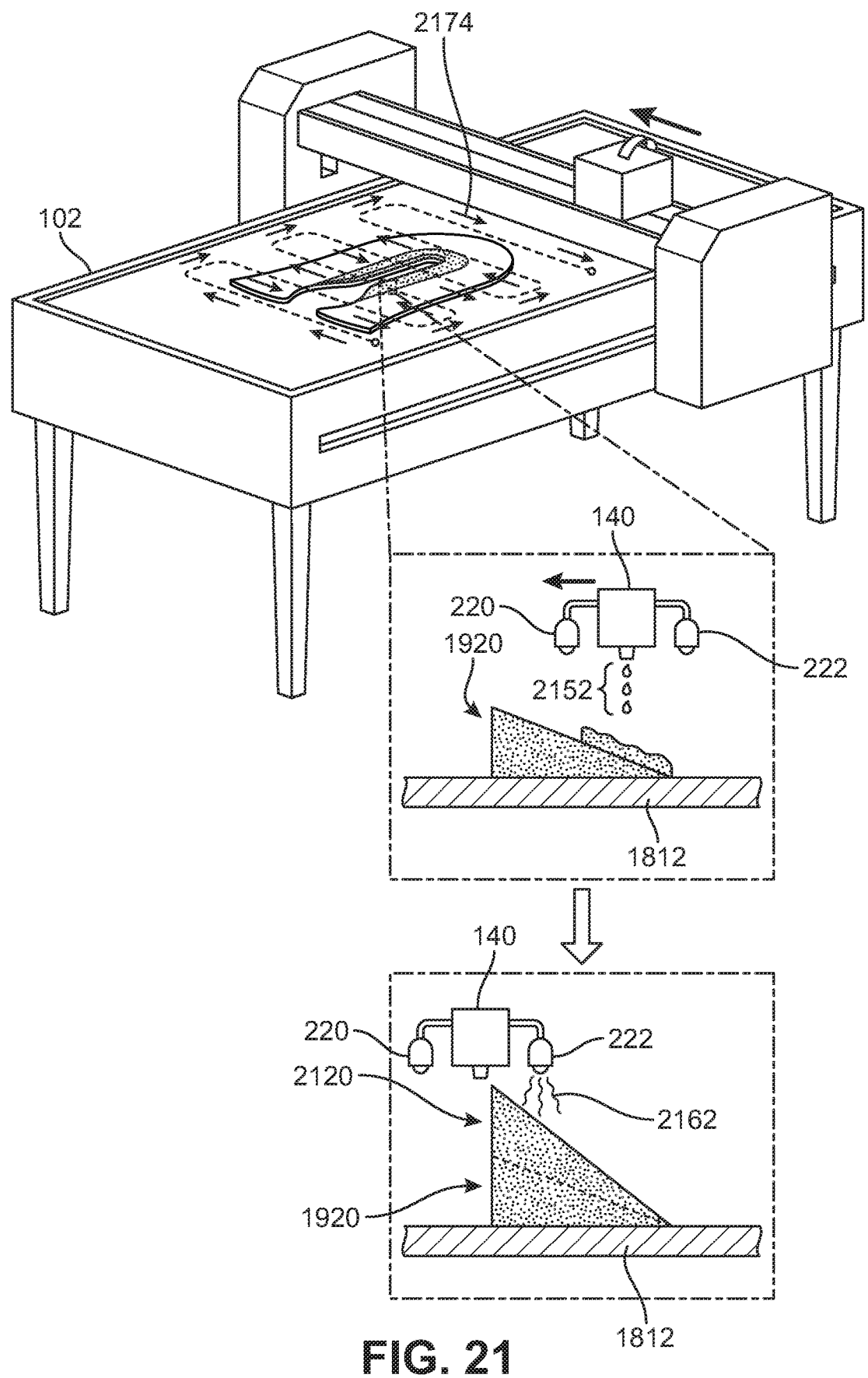
FIG. 21 shows a schematic view of dispensing a print material onto the first layer of FIG. 19 to form a second layer, in accordance with an exemplary embodiment.

In some embodiments, a second layer for the three-dimensional structural component may be printed onto the base using the set of predetermined thicknesses. In some embodiments, the printing of a second layer for a three-dimensional structural component having a smoothly sloped geometry may have one or more features of the printing of a three-dimensional structural component having multiple layers. For example, the printing device may move the printhead assembly in a single pass (e.g., left edge to right edge) for printing different portions of the second layer. In another example, the printing device may move the printhead assembly in a continuous printing path. In another example, printing a portion of the second layer may include dispensing print material in a liquid state from the printhead assembly during the continuous printing path and curing the portion of the second layer during the continuous printing path. In another example, the printing device may print an amount of print material based on the set of predetermined thicknesses. In another example, a separation distance between an upper surface of the base and the printhead assembly may remain constant during the step of printing the second layer and/or during the continuous printing path. Referring to FIG. 21, printhead assembly 140 may dispense print material 2152 in a liquid state from printhead assembly 140 onto first layer 1920 during second continuous printing path 2174. In the example, curing device 222 may emit ultraviolet light 2162 onto first layer 1920 and/or base 1812 to cure second layer 2120. In other embodiments, the printing of a second layer of a set of layers may be different than the printing of a single layer.

Figure 22:
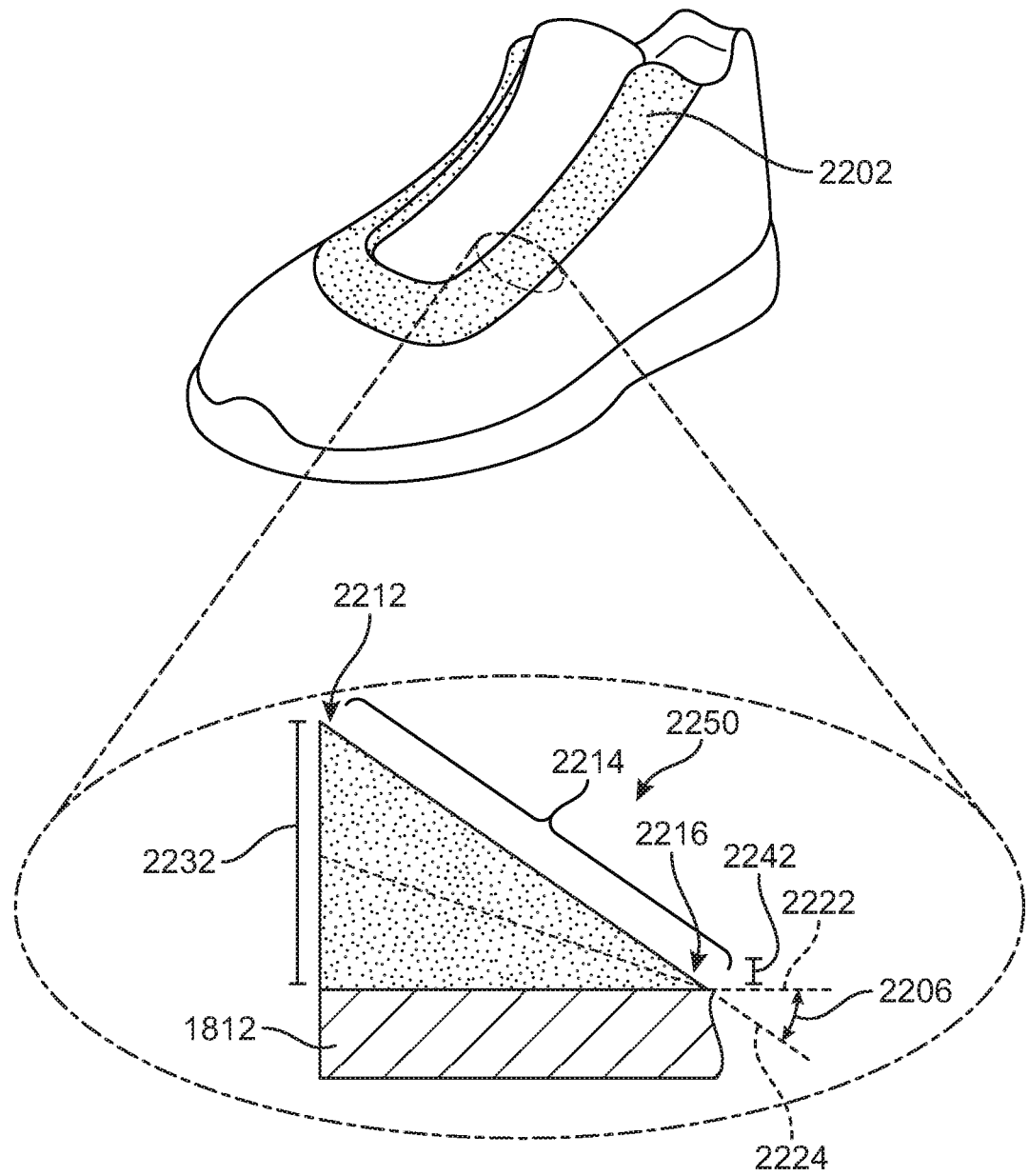
FIG. 22 shows the second layer of FIG. 21, in accordance with an exemplary embodiment.

Generally, the printed set of layers may be considered as including any suitable number of regions for printing a three-dimensional structural component to a desired shape. In some embodiments, the printed set of layers may include a first region and a second region that are connected by a transitioning region. Referring to FIG. 22, printed set of layers 2202 may include exposed surface 2250 having intermediate region 2214 abutting tall region 2212 on one side and abutting short region 2216 on the other side. In other embodiments, the printed set of layers may be considered as having different regions or printing a three-dimensional structural component to a desired shape.

In some embodiments, the short region may have a thickness of less than the separation distance. Referring to FIG. 22, short region 2216 may be formed to have short height 2242. In the example, short height 2242 may be less than separation distance 1934 used to print first layer 1920 (see FIG. 19). In other embodiments, the short region may have a thickness equal to or greater than the separation distance.

In some embodiments, a difference in height between the tall region and the short region may be greater than the separation distance. Referring to FIG. 22, tall region 2212 may have tall height 2232. In the example, tall height 2232 may have a difference in height from short height 2242 that is greater than separation distance 1934 used to print first layer 1920 (see FIG. 19). In other embodiments, a difference in height between the tall region and the short region may be equal to or less than the separation distance.

Generally, the intermediate region may have any suitable shape. In some embodiments, the intermediate region may have a smoothly sloped geometry. As used herein a smoothly sloped geometry may include any suitable geometry that is free of any protrusions, projections, and/or indentations. Such protrusions, projections, and/or indentations may include geometries that are stepped. In some embodiments, the intermediate region may be planar. In some embodiments, the intermediate region may be contoured. As used herein, a region may be considered contoured when it has an irregular shape. Examples of an irregular shape may include non-linear slopes, stepped surfaces, and the like. Referring to FIG. 22, intermediate region 2214 may have a contour that is a linear slope to form printed set of layers 2202 that has a triangular shape. In other embodiments, the intermediate region may have other geometries.

Generally, the intermediate region may have any suitable slope to smoothly transition between a short region and a tall region. In some embodiments, an angle formed between a plane parallel with the intermediate region of the exposed surface and a plane parallel with the base may be between 15 and 75 degrees. Referring to FIG. 22, angle 2206 may be formed between plane 2222 and plane 2224. In the example, plane 2222 may be parallel with base 1812, and plane 2224 may be parallel with intermediate region 2214. In the example, angle 2206 may be 45 degrees. In other embodiments, the angle formed between a plane parallel with the intermediate region of the exposed surface and a plane parallel with the base may be different.

Some embodiments can include provisions for increasing the precision of printing smooth contoured 3D surfaces. In some embodiments, a printing system can include provisions for correlating a spot color percentage for a given ink with a desired ink layer height. Here, the term 'spot color' may refer to the use of a standardized ink or print material for which various properties (such as color density for a given quantity of ink) are known. In other words, a spot color may also be referred to as a standardized color. In the context discussed in the following embodiment, 'spot color' can refer to clear structural inks as well. In some cases, a known greyscale spot color range (0-100%) may be used for a clear structural ink. However, instead of using variations in spot color percentage to control color density in a layer, the print system may use spot color to control the thickness of one or more structural layers.

Figure 23:
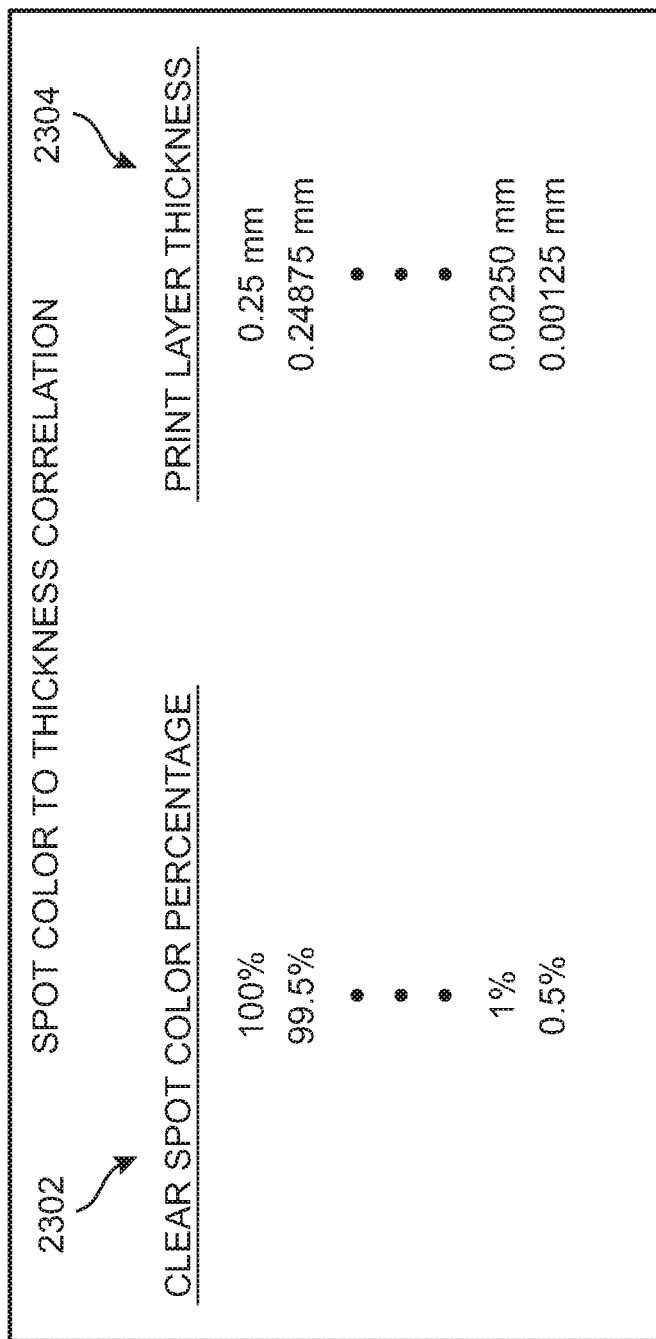
FIG. 23 shows a table correlating spot color and thickness.

FIG. 23 illustrates a schematic relationship between a clear (CLR) spot color percentage for a given clear structural ink (column 2302), and a resulting print layer thickness (column 2304). If provided with the data contained in such a table, a print system can print layers of a wide range of thicknesses by selecting the associated spot color percentage for printing to achieve the desired thickness (alternatively a designer and/or graphics program can provide data with the desired spot color percentages to a printing system to achieved desired thicknesses in the resulting printed object). This may allow for the creation of very smooth contours and height gradients as the print system has very fine and precise control over layer thicknesses.

Figure 24:
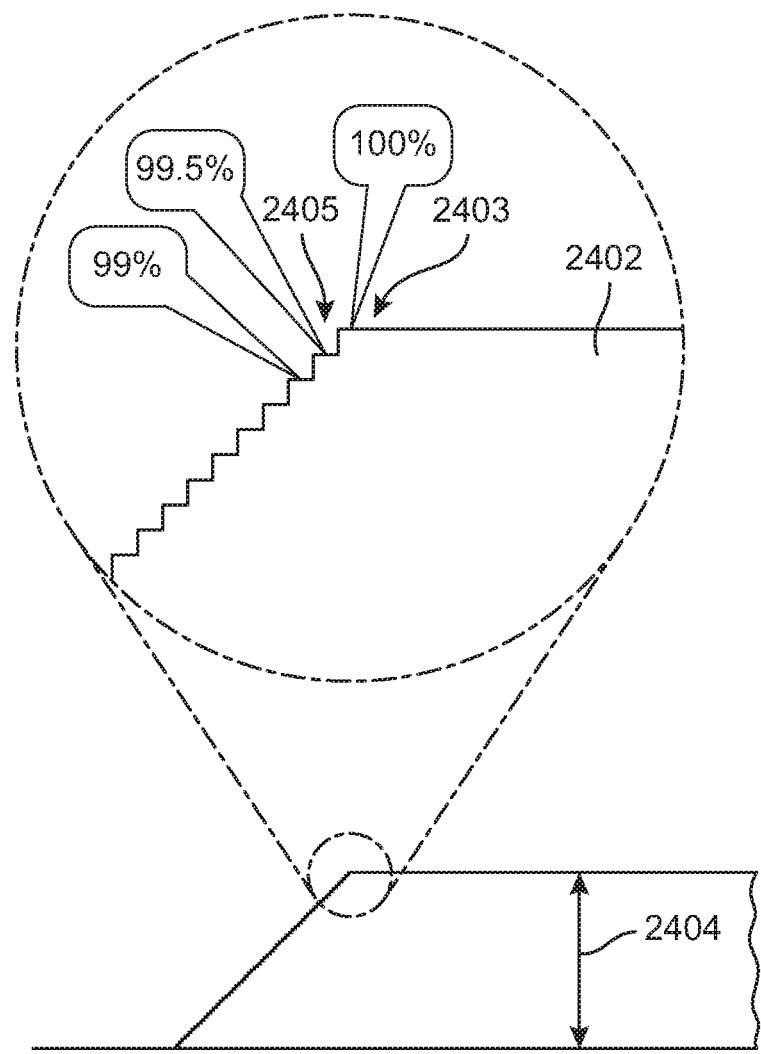
FIG. 24 is an enlarged schematic view of a set of layers printed using a set of spot color percentages, according to an embodiment.
Figure 25:
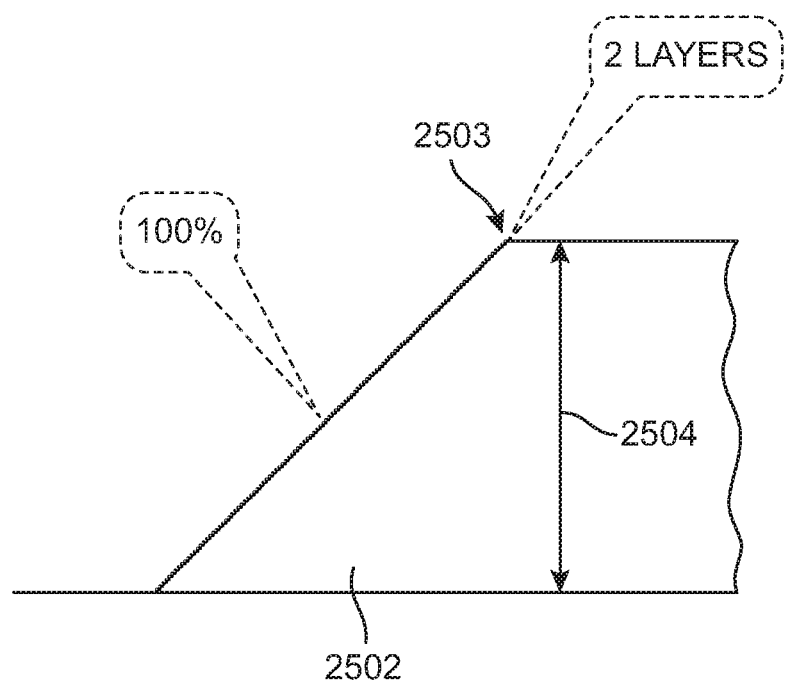
FIG. 25 is a schematic view of a set of layers printed using a set of spot color percentages, according to an embodiment.

For example, FIGS. 24 and 25 illustrate two schematic views of embodiments of printed structures with smoothly varying heights that have been achieved by printing layers according to gradually varying color percentages. In FIG. 24, printed object 2402 has a position 2403 with a maximum height 2404 that corresponds with printing using a 100% spot color designated for the clear structural ink. A position 2405 just adjacent position 2403 has a height that is very slightly less than maximum height 2404 by printing using 99.5% spot color. In FIG. 25, a printed object 2502 has a position 2503 with maximum height 2504 that is twice the maximum height 2404 of FIG. 24. To achieve this thickness, two layers of 100% spot color are printed at position 2503.

In the embodiments of FIGS. 23-25, the corresponding print layer thicknesses are linear in the spot color percentage. In some applications, depending on the type of ink used and/or other properties of the printing system, the print layer thickness may not be linear in the spot color percentage. This may occur because the amount of ink required to linearly vary the color density (which determines the spot color percentages) may result in non-linear variations in height or thickness of printed ink layers. In order to allow a designer to create smoothly varying contours that change in small and regular intervals (layer heights), it may be desirable to find a modified set of spot color percentage values that correspond with a set of regularly spaced thicknesses.

Figure 26:
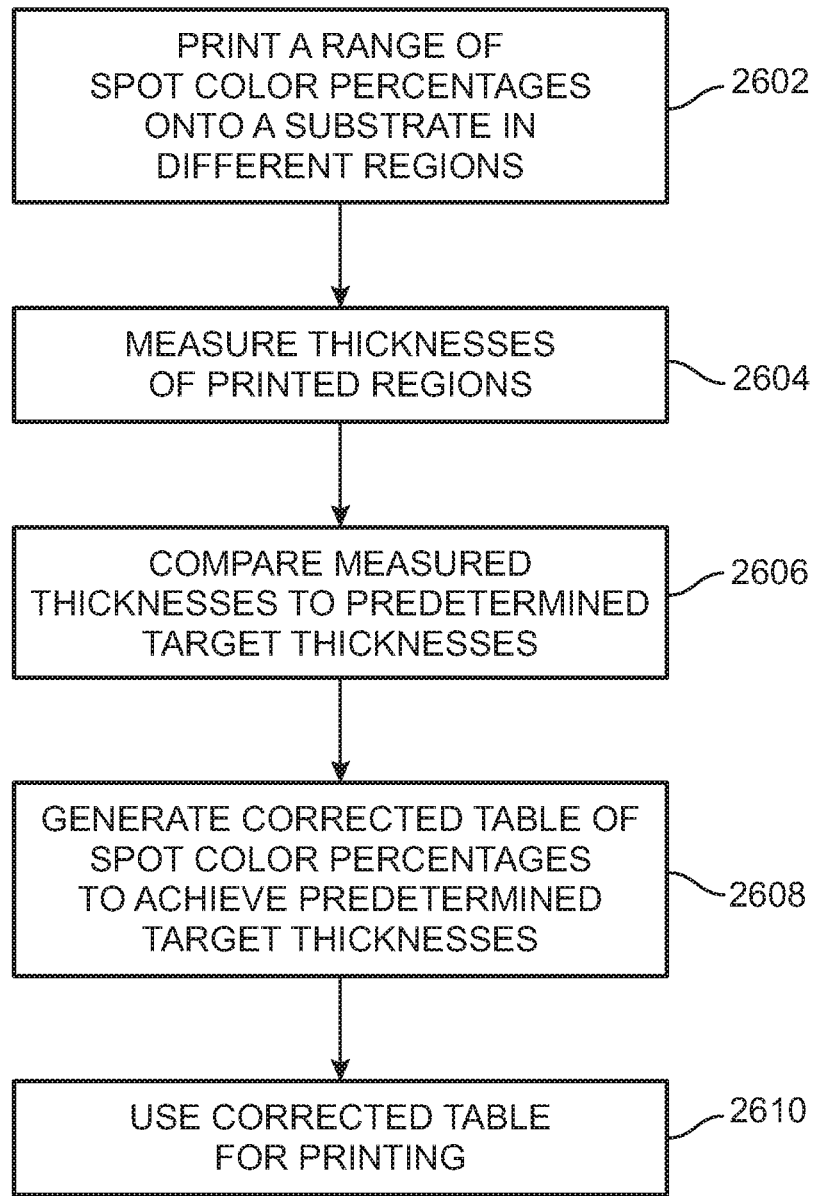
FIG. 26 is a schematic view of a process for generating and using a corrected spot color table for printing.

FIG. 26 illustrates a process for finding a modified (or 'linearized') set of spot color percentages that yield regularly spaced layer thicknesses. At least some of the following steps may be performed by an operator of the printing system, or other system technician. In some cases, one or more of the steps can be performed by the printing system and/or by a separate computing system.

In step 2602, an operator may print a range of spot color percentages to different regions of a substrate. For example, the operator could print 20 spots of ink corresponding to regularly increasing spot color percentages (e.g., 5%, 10%, 15%, etc.). Next, in step 2604, the operator may measure the thicknesses of each region containing ink applied using a different spot color percentage. Exemplary tools and techniques for making such precision measurements can include, but are not limited to: magnetic pull-off gauges, eddy current techniques, ultrasonic techniques as well as other tools and techniques known in the art.

Next, in step 2606, the operator may compare the measured thicknesses to the predetermined target thicknesses, for example using a spreadsheet. In some cases, the predetermined target thickness may be determined according to the assumption that the thickness would vary linearly in height as a function of spot color percentage. In step 2608, the operator may generate a corrected table of spot color percentages for achieving the predetermined target thicknesses (e.g., using a spreadsheet).

Finally, in step 2610, the operator may make sure the corrected or modified table is used during printing. In some embodiments, the modified table could be used on graphic data prior to sending it to the printing system. For example, a graphics program that outputs graphic data for use by the printing system may automatically select spot color percentages for printing using the modified table. In other embodiments, the modified spot color percentages could be incorporated into the software of the printing system (e.g., as logic or as a look-up table stored in a database).

Figure 27:
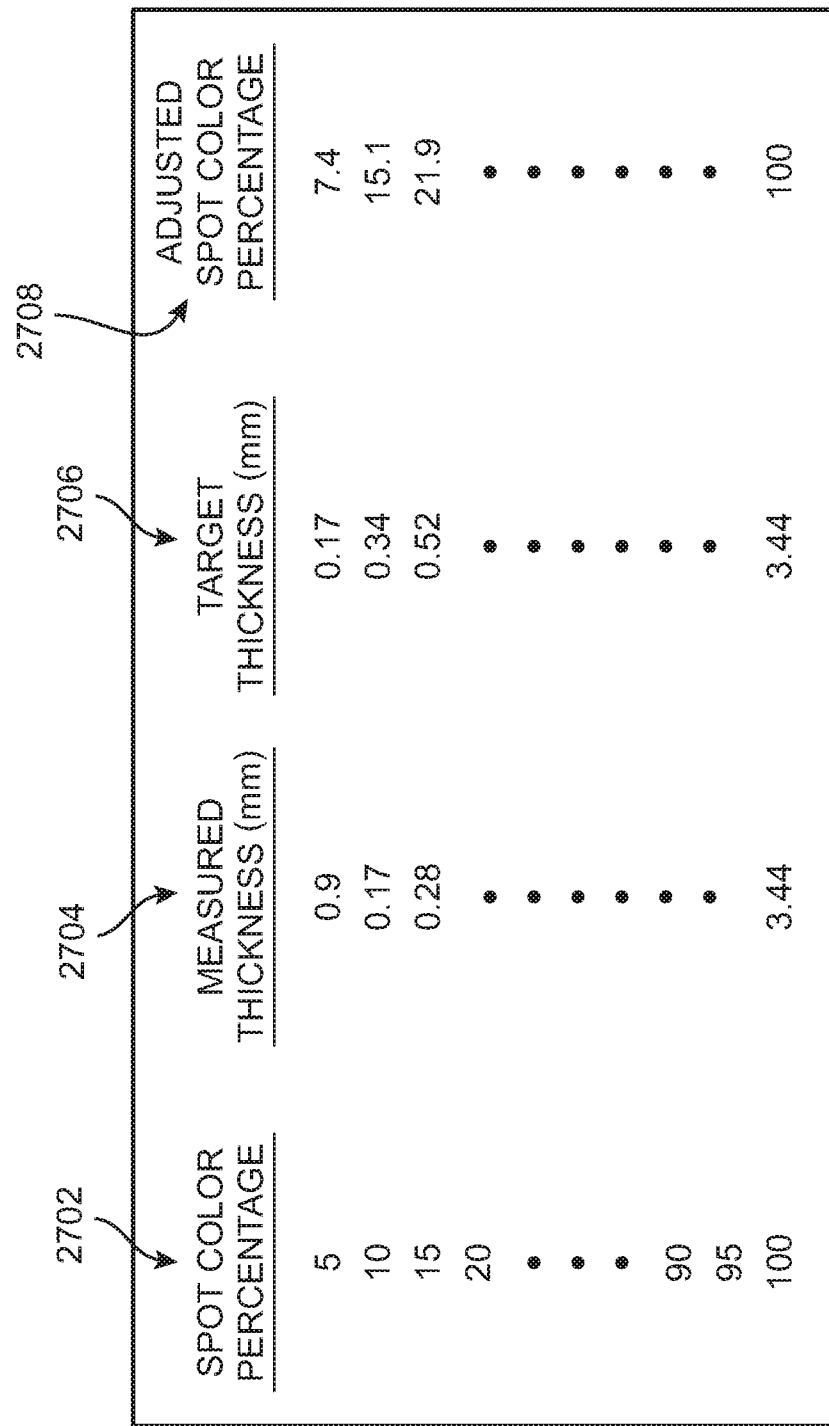
FIG. 27 is a schematic view of a table showing adjusted spot color percentages used to obtain desired target thicknesses.

FIG. 27 illustrates an example of a modified table that provides a correlation between target thickness and an 'adjusted spot color percentage'. In the left-most column 2702 of the table are regular intervals of the spot color percentage from 0 to 100 percent. In the next two columns (column 2704 and column 2706) are the measured layer thickness and target (expected) thickness for those spot color percentages, respectively. Because the measured thicknesses and target thicknesses are different the table includes a final column 2008 with an adjusted spot color percentage. It is the adjusted spot color percentages that should be used to achieve a desired target thickness in the same row, rather than the spot color percentages in the first column 2702. For example, using the table of FIG. 27, in order to print a layer with a target thickness of 0.34 mm (from column 2706) the system should be instructed to print a 15.1% spot color (from the same row in column 2708).

Using the methods described herein a manufacturer can allow a designer to use spot color percentage to net a desired thickness and yield the desired contour with a high level of accuracy. The contour transitions that employ spot color percentage may be smoother than contour transitions that can be achieved by using conventional techniques, such as a three-dimensional file slicing method used by conventional three-dimensional printer that result in topographical map style layer builds. This may be accomplished in an efficient manner by providing print instructions in terms of percentages of known spot colors, for which a printing system, or other software, already has known data (i.e., the amount of ink or print material required to achieve a desired percentage for a given spot color). For example, a graphics program could be configured to output grayscale images with given percentage of a spot color at each pixel that will achieve a desired layer height in a 3D object that corresponds with that pixel.

This spot color percentage may be used in conjunction with the other methods described above to achieve a structural component with a smooth gradient when printing the structural component. Such a method of printing a three-dimensional structural component onto a base may include receiving a set of target thicknesses for a three-dimensional structural component having printed regions. The spot color correlation may be used to determine a thickness for each region of the three-dimensional structural component. Each thickness in the set of target thicknesses may correspond to a different percentage of a selected spot color.

As discussed above, the set of target thicknesses may be provided by a user or calculated by a computer. Each printed region may be printed according to a different percentage of a selected spot color, as shown in FIG. 24. The target thickness for the printed region may be correlated to the percentage of a selected spot color used for printing the printed region, as shown in FIG. 27. The set of target thicknesses has a first thickness and a second thickness. In some embodiments, the first thickness may be less than the second thickness.

A printing device such as printing device 201 may be used to print a single layer for the three-dimensional structural component using the set of predetermined thicknesses. A printing device may print a first region of the single layer onto the base so that the first portion has the first thickness and a second region of the single layer onto the base so that the second portion has the second thickness.

The printed thickness of each printed region may then be measured to compare comparing the printed thickness of each printed region with the target thickness for the printed region. Finally, for each target thickness, an adjusted percentage for the spot color required to print a layer of structural print material having the target thickness may be determined.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or as a substitute for any other feature or element in any other embodiment unless specifically restricted. Accordingly, the embodiments are not to be restricted except in light of the attached claims and their equivalents. Also, various modifications and changes may be made within the scope of the attached claims.

The invention claimed is:

1. A method of printing a three-dimensional structure, comprising:
    receiving a file indicating a plurality of printed regions of a three-dimensional structure to be printed and a plurality of spot percentages of a selected spot color, with each printed region being associated with a spot percentage, wherein the spot color percentages are selected from a range of incremental percentages from 0% to 100%, and wherein each spot percentage corresponds to a print layer thickness for the associated printed region of the three-dimensional structure;
    determining a layer thickness profile comprising the print layer thicknesses for each of the plurality of printed regions across the three-dimensional structure; and
    successively printing a plural number of layers of a structural print material in the printed regions on a substrate to build up to the three-dimensional structure, wherein each of the layers has the same layer thickness profile across the plurality of printed regions;
    such that, for each printed region of the resulting three-dimensional structure, each layer of deposited structural print material is equal in thickness, while overall structure heights for the plurality of printed regions vary across the three-dimensional structure; and
    wherein each of the printed regions of the printed three-dimensional structure contains the same number of layers of the structural print material.

2. The method of claim 1, wherein the overall structure height of the three-dimensional structure at each printed region corresponds to the number of the layers of structural print material that are printed multiplied by the print layer thickness for that respective printed region.

3. The method of claim 1, wherein the selected spot color is grey or black.

4. The method of claim 1, wherein each of the layers contains an equal amount of structural print material.

5. The method of claim 1, wherein the received file comprises a monochromatic image comprising a plurality of pixels that correspond to the plurality of printed regions, wherein each pixel comprises a shade of the selected spot color, wherein the shade of each pixel corresponds to the spot percentage for the respective printed region.

6. The method of claim 5, wherein the thickness profile for each layer of structural print material is based on the monochromatic image.

7. The method of claim 1, wherein the plurality of printed regions comprises at least 20 printed regions.

8. The method of claim 1, wherein the spot percentages comprise even increments between 0% and 100%.

9. The method of claim 1, wherein the print layer thickness for each printed region varies linearly as a function of the spot percentage for the respective printed region.

10. The method of claim 1, wherein each of the number of layers is printed with a two-dimensional printer.

11. The method of claim 1, wherein printing the number of layers of structural print material comprise printing at least five successive layers of structural print material.

12. The method of claim 1, wherein printing the number of layers of structural print material comprise printing at least ten successive layers of structural print material.

13. The method of claim 1, wherein the printed three-dimensional structure has a contoured upper surface.

* * * * *